US008996190B2

(12) United States Patent
Williams

(10) Patent No.: US 8,996,190 B2
(45) Date of Patent: Mar. 31, 2015

(54) METHOD AND APPARATUS FOR CONTROLLING ELECTRICAL LOADS TO PROVIDE POSITIVE DAMPING OF POWER GRID OSCILLATION

(76) Inventor: Michael Lamar Williams, Frederick, MD (US)

(*) Notice: Subject to any disclaimer, the term of this patent is extended or adjusted under 35 U.S.C. 154(b) by 685 days.

(21) Appl. No.: 13/406,314

(22) Filed: Feb. 27, 2012

(65) Prior Publication Data
US 2012/0226385 A1    Sep. 6, 2012

Related U.S. Application Data

(60) Provisional application No. 61/447,933, filed on Mar. 1, 2011, provisional application No. 61/589,642, filed on Jan. 23, 2012.

(51) Int. Cl.
H02J 3/24    (2006.01)
H05B 37/02    (2006.01)

(52) U.S. Cl.
CPC .............. *H05B 37/0227* (2013.01); *H02J 3/24* (2013.01)
USPC ........................................ 700/295

(58) Field of Classification Search
None
See application file for complete search history.

(56) References Cited

U.S. PATENT DOCUMENTS

| 4,249,113 A | 2/1981 | Werner | |
| 4,292,580 A * | 9/1981 | Ott et al. | 323/212 |
| 5,625,277 A * | 4/1997 | Khan et al. | 322/58 |
| 5,661,645 A | 8/1997 | Hochstein | |
| 5,737,177 A | 4/1998 | Mett et al. | |
| 6,051,941 A | 4/2000 | Sudhoff et al. | |
| 7,508,224 B2 | 3/2009 | Williams | |
| 8,044,672 B2 | 10/2011 | Williams | |
| 2006/0229768 A1 | 10/2006 | Chassin et al. | |
| 2007/0241759 A1* | 10/2007 | Williams | 324/600 |
| 2010/0274407 A1 | 10/2010 | Creed | |
| 2012/0232820 A1* | 9/2012 | Wilson | 702/72 |
| 2013/0099582 A1* | 4/2013 | Ray et al. | 307/102 |
| 2013/0175871 A1* | 7/2013 | Knuppel et al. | 307/102 |
| 2013/0257166 A1* | 10/2013 | Chen et al. | 307/102 |

OTHER PUBLICATIONS

Sankaran, C., "Power Quality", Book, 2002, entire document, CRC Press, LLC., ISBN 0-8493-1040-7, http://www.fer.unizg.hr/_download/repository/Power_Quality.pdf.
Dagle, J. "Grid Oscillations Limiting Your Power," CEC/CIEE Review Meeting Sacramento,CA, Oct. 25, 2010. http://www.energy.ca.gov/research/notices/2010-10-25_symposium/presentations/7%20Grid%20Oscillations-Limiting%20Your%20Power.pdf.
Williams, Michael L. "Measurement of Stability Margins in Single-Phase and Polyphase Switchmode Power. Systems—A Tutorial Introduction," Proceedings, American Society of Naval Engineers Electric Machines Technology Symposium, Jan. 2004, Philadelphia, PA.

(Continued)

*Primary Examiner* — Ryan Jarrett
(74) *Attorney, Agent, or Firm* — Aust IP Law; Ronald K. Aust

(57) ABSTRACT

A method and apparatus is provided for controlling an electrical load exhibiting destabilizing negative-resistance negative-damping characteristics to provide positive damping of power grid oscillations and for controlling the electrical load to operate at a reduced power level when the power grid voltage is reduced.

21 Claims, 22 Drawing Sheets

(56) References Cited

OTHER PUBLICATIONS

U.S. Lighting Market Characterization, vol. 1: National Lighting Inventory and Energy Consumption Estimate, Final Report, Sep. 2002, DOE EERE. http://apps1.eere.energy.gov/buildings/publications/pdfs/ssl/lmc_vol1_final.pdf.

Welch, Allyn; Fink, D. G.; Wayne Beaty "Lamp rerating" http://en.wikipedia.org/wiki/Lamp_rerating.

IEEE 141 Flicker Threshold.

Phadke, J.A. and Thorpe, J.S. "Synchronized Phasor Measurements and their Applications", (2008) Springer Science, ISBN: 978-0-387-76535-8.

Pai, M. A., Gupta, D. P. Sen, Padiyar, K.R. "Small Signal Analysis of Power Systems" Narosa Series on Power and Energy Systems, ISBN: 978-81-7319-594-5.

International Rectifier Inc. "IRPLDIM3 Wide Range Input Linear Dimming Fluorescent Ballast using the IRS2158D" (Reference Design) http://www.irf.com/technical-info/refdesigns/irpldim3.pdf.

"Fairchild Semiconductor FAN7529 Critical Conduction Mode PFC Controller specification", http://www.fairchildsemi.com/ds/FA/FAN7529.pdf.

International Rectifier IRS2980 LED Driver Controller Specification. http://www.irf.com/product-info/datasheets/data/irs2980spbf.pdf.

"International Rectifier Application Note AN-1171 IRPLLED7 90-250VAC Offline LED Driver using LEDrivR IRS2980". http://www.irf.com/technical-info/appnotes/an-1171.pdf.

Texas Instruments SCAA035B "CMOS Power Consumption and Cpd Calculation" Jun. 1997, http://www.ti.com/lit/an/scaa035b/scaa035b.pdf.

\* cited by examiner

METHOD AND APPARATUS FOR CONTROLLING ELECTRICAL LOADS TO PROVIDE POSITIVE DAMPING OF POWER GRID OSCILLATION

CROSS REFERENCE TO RELATED APPLICATIONS

This application is based upon U.S. Provisional Patent Application Ser. No. 61/447,933, entitled "METHOD OF MODIFYING MOTOR & LIGHTING LOADS TO PROVIDE POSITIVE DAMPING OF POWER GRID OSCILLATION", filed Mar. 1, 2011, and U.S. Provisional Patent Application Ser. No. 61/589,642 entitled "METHOD OF MODIFYING LED LIGHTING & DIGITAL LOADS TO PROVIDE POSITIVE DAMPING OF POWER GRID OSCILLATION", filed Jan. 23, 2012, both from which priority is claimed, and which are incorporated herein by reference.

BACKGROUND OF THE INVENTION

1. Field of the Invention

The present invention relates to the control of electrical loads, such as for example, high-efficiency lighting systems and motor systems. More particularly, the present invention relates to a method and apparatus for controlling an electrical load exhibiting destabilizing negative resistance negative damping characteristics to provide positive damping of power grid oscillations and for controlling the electrical load to operate at a reduced power level when the power grid voltage is reduced.

2. Description of the Related Art

The quest for ever higher energy efficiency is being pursued with little concern for the resulting impact on stability of the power grid. The power grid has an ever-increasing tendency to become unstable and oscillate.

FIG. 1 presents a 0.5 Hz ringing transient waveform that has a damping ratio of five percent. Transient waveforms of this sort are observed frequently on the power grid. Although a system that has such a transient response would be classified as stable, it is clear from the ringing nature of the waveform that the power grid has a very poor margin of stability. Waveforms of this sort are judged as being a "cause for concern" if the degree of damping is five percent or less and judged as being a cause for remedial action if the degree of damping is three percent or less.

The waveform of FIG. 1 is intended to represent the power grid transient response as observed in the synchronous reference frame, wherein the observer would be revolving at synchronous speed and observing the generator shaft angle advance and retard relative to the synchronous speed undisturbed reference position. A similar observation could be made using a stroboscope to view an index mark on the generator shaft. The existing and growing tendency toward oscillatory instability is a very substantial cause for concern. Establishing five percent damping as the threshold of "cause for concern" is simply a necessary act of triage. In the interest of energy efficiency, we are replacing loads that have a stabilizing effect, such as electric water heaters, electric resistance heating, incandescent lamps, and inductive ballast fluorescent lamps, with destabilizing loads, such as heat pumps, high power-factor fluorescent ballasts and light-emitting diode (LED) drivers. Considering the current state of marginal stability, it appears likely that the power grid soon will become dysfunctional as a result of more frequent instances of oscillatory instability unless the present design philosophy related to power system loads is modified.

For lighting systems, the related art involves flicker, incandescent lamps, fluorescent lamps employing conventional inductive ballasts, compact fluorescent lamps, LED lighting, modern high-efficiency high-power-factor electronic ballasts and LED drivers. For motor systems, the related art involves motors and variable speed drives (VSD). For all of these systems, the related art involves constant power loads, energy efficiency, the Synchrophasor system and oscillatory instability of the national power grid(s.

Suppressed-carrier methods of measuring small-signal incremental impedance characteristics, that determine the effect that system loads have on damping of power grid oscillation, are also involved. Suppressed-carrier measurement methods involve stimulus injection and response extraction. Stimulus is provided by quadrature axis and/or direct axis modulation of the mains voltage, injection of a quadrature axis and/or direct axis suppressed carrier stimulus voltage, or injection of a quadrature axis and/or direct axis suppressed carrier stimulus current. Response extraction involves quadrature axis and/or direct axis demodulation of response signals that result from the stimulation. Suppressed carrier impedance is determined by the ratio of a demodulated response voltage and a demodulated response current. The methods produce a Nyquist diagram from the ratio of two demodulated response voltages or two demodulated response currents, from which the margin of stability may be determined from the minimum return difference, or the less exact method of gain margin and phase margin. Suppressed carrier measurement methods are described in more detail in U.S. Pat. Nos. 7,508,224 B2 and 8,044,672. Oscillatory instability of AC powered systems tends to occur in modulation sidebands spaced symmetrically about the mains frequency. Hence, the label suppressed carrier. The mains frequency component simply supplies the quiescent power that permits the oscillation to occur.

A constant-power load characteristic causes the line current to increase when the line voltage is decreased and to decrease when the line voltage is increased, thereby resulting in a negative resistance, regenerative quality that contributes negative damping of power grid oscillations. A constant-power characteristic also prevents load shedding from occurring when the grid voltage is reduced, such as during a deliberate brown out. The low-frequency per-phase input impedance of a constant power load is presented in EQ.1.

$$R_{CP} = -V_{IN}^2 / P_{IN} \qquad \text{EQ.1}$$

Where: $V_{IN}$=the rms mains voltage, line-to-neutral
$P_{IN}$=the per-phase input power.

Incandescent and fluorescent lighting consumes approximately 22 percent of the electrical energy produced in the United States, according to U.S. Lighting Market Characterization, Vol 1: National Lighting Inventory and Energy Consumption Estimate, Final Report, September 2002, DOE EERE. Because the installed base lighting consists primarily of incandescent lamps and fluorescent systems utilizing older inductive ballasts, it has a significant positive damping characteristic. Unless the current design philosophy is modified, the lighting load will be converted to use high-efficiency electronic ballasts, or LED drivers that have a constant-power characteristic. The high-efficiency lighting would then consume an estimated 14 percent of energy produced, but it would have a negative damping characteristic. Converting 22 percent of the total grid load from positive damping to 14 percent negative damping would be devastating.

Legislative action has been taken at the federal level to phase-out incandescent lamps in favor of more energy efficient lighting. Older fluorescent lamps, such as the T12 are being replaced with more energy efficient T8 and T5 lamps. Older inductive fluorescent ballasts, that have poor power factor, are being replaced with modern electronic ballasts that offer higher efficiency and very high power factor. LED lighting is replacing fluorescent lighting in commercial and industrial applications because of lower maintenance cost and is expected to be used widely in residential applications as LED systems are further developed and prices are reduced. LED technology is beginning to mature. A wide variety of LED driver controller integrated circuits is becoming available. A review of currently available electronic ballasts and LED drivers indicates that lighting systems employing these drivers will have a constant power negative resistance negative damping characteristic.

There are substantial functional and economic benefits to be derived by replacing older incandescent and fluorescent systems with more efficient lighting systems that employ more efficient electronic ballast, more efficient fluorescent lamps and highly efficient LED's and LED drivers. The high efficiency, high power factor and very low harmonic current characteristics obtainable with modern electronic fluorescent ballasts and LED drivers are highly desirable. Older inductive fluorescent ballasts have a poor power factor. However, they provide significant positive damping. The compact fluorescent lamp (CFL) employs electronic ballast that has a poor power-factor and produces significant harmonic distortion in the line current. Measurement of the impedance characteristics of four different brands of CFL's indicated that some brands have a weak negative resistance quality whereas others have a weak positive resistance quality. The net effect of a combination of all brands is estimated to form a constant current load that has no impact on damping. The primary concern, regarding replacement of incandescent lamps with CFL's, is the loss of damping provided by the incandescent lamps that are being replaced. Because of toxic mercury content, compact fluorescent lamps will probably soon be replaced by LED, or other high efficiency lighting.

Although incandescent lamps have a resistive impedance characteristic, the nonlinear nature of these lamps causes the damping effect to be only fifty-five percent of that provided by a Watt equivalent resistor. The degree of damping, provided by incandescent lamps, is determined by the incremental resistance of their filaments. An elegant mathematical characterization of incandescent lamps, operating over a range of applied voltage, has been developed and is attributed to Welch Allyn Inc., Fink and Beaty. EQ.2, EQ.3 and EQ.4 are a subset of the equations, and are set forth below. The complete set is available on the internet at http://en.wikipedia.org/wiki/Lamp_rerating. The availability of these equations greatly facilitates the understanding and quantification of incandescent lamp behavior. EQ.5 is not included in the complete set, but may be derived from EQ.2 or EQ.4, and is set forth below. In the course of deriving EQ.5 from both EQ.2 and EQ.4, it becomes apparent that the exponents in EQ.2 and EQ.4 should be related such that the exponent in EQ.4 will be equal to the exponent in EQ.2 plus 1.0. In EQ.4, the exponent has been changed from 1.6 to 1.55. This change is arbitrary, but it resolves the apparent conflict and produces a result that closely matches the incremental resistance values measured with the samples used in the course of the present work. It must be noted that EQ.2, EQ.3, EQ.4 and EQ.5 represent performance under static conditions. The thermal time-constant of the lamp filament causes a pole-zero roll-off response as the modulation frequency of the line voltage is increased.

$Va$ = Applied voltage
$Vd$ = Design voltage
$Ia$ = Current at applied voltage
$Id$ = Current at design voltage
$La$ = Luminous intensity at applied voltage
$Ld$ = Luminous intensity at design voltage
$Pa$ = Power at applied voltage
$Pd$ = Power at design voltage
$Ri$ = Incremental resistance at applied voltage $$Ia = (Va/Vd)^{0.55} \times Id \quad\quad\quad \text{EQ.2}$$

$$La = (Va/Vd)^{3.45} \times Ld \quad\quad\quad \text{EQ.3}$$

$$Pa = (Va/Vd)^{1.55} \times Pd \quad\quad\quad \text{EQ.4}$$

$$Ri = ((Vd^N)/(N \times Id)) \times (Va^{1-N}) \text{ where } N=0.55 \quad\quad\quad \text{EQ.5}$$

FIG. 2 presents the suppressed-carrier impedance of a combination of one 100 Watt and one 60 Watt lamp that forms a 160 Watt incandescent lamp, operating at 120 Vrms, over a modulation frequency span of 0.1 Hz to 30 Hz. The measurements indicate that the incremental impedance of the sample incandescent system, at a modulation frequency of 0.1 Hz, is 166 Ohms. This value agrees closely with the 161 Ohm theoretical value implied by EQ.5. The near zero degree phase angle at low frequencies confirms the positive resistance positive damping characteristic, as would be expected. In the frequency region above approximately 1 Hz, the impedance reduces rapidly. Reduction of the impedance is attributed to the thermal time-constant of the incandescent filament. The phase angle lags in this frequency region in a manner that is similar to that of a pole-zero lag-lead filter.

FIG. 3 presents the flicker susceptibility of the 160 Watt incandescent lamp. Flicker susceptibility places a limit on the degree of positive damping that can be realized via modification of modern high-power-factor electronic ballast and LED drivers. The ubiquitous incandescent lamp is used, herein, as the flicker performance standard in establishing the degree of flicker susceptibility that would be acceptable. For flicker susceptibility tests, the network analyzer measures the transfer function between the network analyzer Source signal, that is used to amplitude modulate the mains voltage, and the output of a selenium photocell that is placed appropriately to measure the light output of the lighting system under test. All extraneous light is blocked to ensure that the photocell output is zero with the lighting system under test turned off. With zero modulation of the mains voltage, the photocell is positioned at a distance from the light source to cause the output of the photocell to be equal to 50 my, that is equivalent to approximately 840 Lux. The photocell employed was removed from a Yokogawa YEW 3281 LUX Meter and was terminated with a 383 Ohm resistor to simulate the loading of the YEW 3281 scale attenuator in the 1000 Lux range. This photocell configuration eliminates the motor-generator effect of the analog meter movement of the YEW 3281 LUX meter that would respond to Lux modulation and cause error. It also provides an output of 50 mV, that is substantially larger than the signal that would be available at the Lux meter terminal posts. For comparative flicker susceptibility tests, scale factors are not important. The primary intent is simply to compare flicker susceptibility of a given lighting system with that of the incandescent system. By adjusting the position of the photocell to provide a 50 mV output for any lighting system under test, flicker susceptibility of the system being measured may be done by simply comparing the resulting Source frequency component of the photocell output with that produced by the incandescent system.

FIG. 4 presents the IEEE 141 Flicker Threshold that establishes a limit on allowable periodic square-wave amplitude modulation of the mains voltage. For sinusoidal amplitude modulation, the amplitude limit can be increased by approximately 2 dB. Human sensitivity to lighting flicker varies with frequency and is the most sensitive in the region near 12 Hz. Lighting flicker is undesirable. Flicker can be annoying to human observers and excessive flicker can cause physiological disturbance, particularly to those subject to epilepsy. The flicker susceptibility of incandescent lamps is evident from the 3.45 exponent of EQ.3. High quality electronic fluorescent ballasts and LED drivers reduce lighting flicker in the process of operating the lamp at a constant power level regardless of mains voltage variations. Toward this end, they provide a desirable function. However, converting a significant portion of the lighting load to use constant power electronic fluorescent ballasts, and LED drivers, could cause the power grid to fail.

FIG. 5 presents the suppressed carrier impedance of a dual 20 Watt T12 fluorescent light that employs a typical older style inductive ballast. The near-zero phase angle shown in the data indicates that the impedance has a positive resistance positive damping quality at all modulation frequencies up to and beyond 30 Hz. The positive damping provided by this particular inductive ballast fluorescent light is approximately 1.5 times that provided by a Watt equivalent resistor of 447 Ohms.

FIG. 6 presents the suppressed carrier impedance of a 28 Watt T5 fluorescent light employing an Advance Inc. Centium ICN-132-MC high power factor electronic ballast. The near-180 degree phase angle in the low frequency data indicates that the impedance has a negative-resistance negative-damping quality in the modulation frequency band below approximately 3 Hz that includes the frequencies of concern involving oscillatory instability of the power grid. Examination of currently available LED driver controllers indicate that they are intended to operate in a constant power mode that would produce negative resistance negative damping qualities similar to those shown in FIG. 6.

Induction motors consume approximately half of the energy produced in the United States. When operated by direct connection to the power line, induction motors have a constant-power characteristic. For a given motor load, output power is determined primarily by motor shaft speed, which is determined primarily by mains frequency. Shaft speed varies little with mains voltage.

FIG. 7 presents the wye form phase to neutral suppressed-carrier impedance of a one horsepower three-phase induction motor driving a load that causes the motor to consume 200 Watts of input power at a reduced 49.1 Vrms line-to-neutral voltage. At low frequencies, the phase angle of the impedance is approximately −180 degrees, thereby confirming that the induction motor has a negative-resistance input impedance. The negative-resistance negative-damping characteristic exists for modulation frequencies below approximately 2.5 Hz. With an input power of 66.7 Watts per phase, the magnitude of the line to neutral impedance is predicted to be −36.1 Ohms by the constant power law of EQ.1. At 0.2 Hz, FIG. 7 indicates a value of 31.1956 dB//Ohm, or −36.3 Ohms that is in close agreement with the predicted value.

In a very large portion of motor applications, substantial energy savings can be obtained by operating motors as variable-speed drives (VSD). As an example, a ventilation fan operating at eighty percent of full speed consumes only fifty percent of the energy required to operate at full speed. With a variable-speed drive, motor speed can be adjusted to provide the optimum mechanical energy to perform the assigned task, rather than being cycled in a full-speed, zero-speed manner. The potential energy savings provide a strong economic incentive to employ variable-speed drives in applications wherein constant speed is not required and the economically optimum speed varies widely with the existing conditions.

Although operating induction motors via variable speed drives can provide a substantial improvement in efficiency, the impedance presented to the power line continues to have a negative resistance negative damping quality. If the drive output frequency and voltage applied to the motor remains fixed under varying line voltage conditions, the VSD would approximate a constant power load.

FIG. 8 and FIG. 9, respectively, present the suppressed carrier impedance of an unmodified Boston Fincor ACE-KL 2 hp VSD operating in "constant torque" and "fan-pump" mode. The low-frequency impedance values are higher than those expected from constant power operation. Maintaining a drive frequency at its programmed value would appear to be a simple task. In principle, constant torque mode requires that the voltage applied to the motor be increased in proportion to the programmed frequency. The proportional voltage compensates for the proportional back emf produced by proportional motor shaft speed resulting from the programmed frequency. The proportional voltage is required to maintain a fixed motor current, wherein the current determines the motor torque. In the interest of cost reduction, the VSD design may simply employ pulse width modulation of the rectified mains voltage to generate the motor voltage. Under the assumption that the mains voltage remains approximately constant, the pulse width would be increased in proportion to the programmed frequency. In this scenario, motor torque would be a function of mains voltage, thereby causing an alteration of the constant torque intent. The constant power characteristic would also be altered. In variable torque mode, such as used for driving fans, the motor voltage is varied exponentially with programmed drive frequency. The constant power characteristic would be altered to a greater extent.

The power grid has an ever-increasing tendency to become unstable and oscillate. The oscillation is in the form of low frequency torque oscillation of the rotating generator shafts. Although these oscillations begin at very low levels, they can quickly grow to levels that are highly disruptive and destructive. These oscillations are generally characterized in three distinct forms: inter-area, local mode and inter unit. Inter-area oscillations involve groups of generators that are located in widely separated geographical areas that are connected by very long transmission lines. These groups of generators oscillate in opposition to each other. Local-mode oscillation involves one or more generators, in a given geographical area, that are connected to the power grid by a common transmission line. These generators oscillate in unison against an otherwise stable power grid. Inter-unit oscillation involves oscillation between opposing units, or groups of units, in close proximity to each other, that are connected to the power grid by a common transmission line. Inter-area oscillation tends to occur in the frequency range of 0.1 to 0.5 Hz. Local-mode oscillation tends to occur in the frequency range of 0.7 to 2.0 Hz. Inter-unit oscillation tends to occur in the frequency range of 1.5 to 3.0 Hz. The length of the transmission line is a major factor in determining the frequency of oscillation. Heavy loading of the generators and transmission line tends to increase the likelihood of oscillatory instability. Inter-area oscillations tend to be the most troubling because they involve enormous levels of power and the situation is more complex because of the large number of generators involved. Local Mode oscillations are a frequent problem that may limit the amount of power that can be transmitted over the interconnecting transmission line. Inter Unit oscillations have been observed, but do not appear to be a major concern relative to the other two forms.

When the margin of stability is small, as is frequently the case, load fluctuations and switching transients produce damped sinusoidal perturbations of the grid voltage. Wavelet analysis of these damped sinusoids can be used to evaluate the degree of damping and thereby obtain an estimate of the margin of stability. Damping of 5 percent or less is considered to be cause for concern. Damping of 3 percent or less is considered to be cause for remedial action, involving dispatch of additional generation resources or rerouting of power transmission, to the extent that such options are available, or load shedding. With damping of zero percent, the sinusoidal perturbations do not decay. If net damping becomes negative, the oscillations can grow to dangerous and destructive levels. A negative damping situation demands immediate action that may involve emergency load dumping to avoid collapse of the power grid or a wide area blackout. Generators experiencing torque oscillation may be disconnected from the power grid to self-protect from damage. The resulting loss of generation capacity tends to exacerbate the situation and may produce a domino effect resulting in a wide area blackout.

The Synchrophasor system, currently under development, is designed to monitor power grid damping, synchronization, power flows and other parameters at a multitude of points on the power grid over the entire geographical area. Information thus obtained will be used by the Smart Grid to optimize power grid performance, thereby providing a major improvement in the ability to properly manage the power grid. Conceptually, the Synchrophasor system can process the collected data and derive control signals to be sent to the individual generators to cause them to react in a manner that opposes oscillation. In this mode, the Synchrophasor system would function as a Power System Stabilizer (PSS) for the entire power grid. Such a feature appears to be attractive. However, if the national power grid becomes dependent upon such a system in order to remain stable, this feature would be dangerous because centralization of stability control would create single-point-of-failure mechanisms. For example, the Synchrophasor system is dependent upon the Global Positioning System (GPS) for time synchronization. Momentary loss of the GPS would trigger massive oscillatory instability resulting in collapse of the power grid. The power grid needs to have a larger degree of inherent stability.

What is needed in the art is a method and apparatus for controlling an electrical load exhibiting destabilizing negative resistance negative damping characteristics to provide positive damping of power grid oscillations and for controlling the electrical load to operate at a reduced power level when the power grid voltage is reduced.

SUMMARY OF THE INVENTION

The present invention provides a method and apparatus for controlling an electrical load exhibiting destabilizing negative resistance negative damping characteristics to provide positive damping of power grid oscillations and for controlling the electrical load to operate at a reduced power level when the power grid voltage is reduced.

The present invention attempts to reverse the current trend toward massive oscillatory instability of the power grid. The present invention describes very simple and low cost design modifications of high-power-factor electronic fluorescent ballasts, LED drivers and motor systems that cause the lighting systems and motor systems to provide positive damping of oscillatory instability.

The present invention also provides graceful load shedding via grid voltage reduction, whereas the present trend toward the use of constant-power loads inhibits the ability to shed load in that manner. Graceful load shedding via reduction of grid voltage provides a method of peak load shaving that is preferable to rolling blackouts or Smart-Meter on-off control of air conditioners, etc. With the present invention, the message would be inherently in the mains voltage, therefore, no other form of communication would be required to inform the loads that a reduction in power consumption is needed. The inherent soft-start characteristic of this form of load shedding would also improve the recovery process during power restoration following a fault.

The invention in one form is directed to a method of controlling an electrical load exhibiting destabilizing negative-resistance negative-damping characteristics to provide positive damping of power grid oscillations and for controlling the electrical load to operate at a reduced power level when the power grid voltage is reduced, the electrical load being coupled to an AC mains voltage of a mains supplied by the power grid, and the electrical load having a voltage control input $V_{PC}$ to control the amount of power that is delivered to the load, the method comprising: determining a maximum proportionality factor $N_{NET}$ to which a load power of the electrical load can be permitted to vary in proportion to voltage fluctuations of the AC mains voltage; determining a factor $N_{INHERENT}$ to which the load power of the electrical load varies as a function of the control voltage input $V_{PC}$; determining a constant $N_{CONTROL}$, wherein the constant $N_{CONTROL}$ is the ratio of the proportionality factor $N_{NET}$ and the factor $N_{INHERENT}$, such that $N_{CONTROL}=N_{NET}/N_{INHERENT}$; measuring a modulation envelope of the AC mains voltage, the modulation envelope including a component equal to the peak value $V_{PDNOM}$ of the nominal mains voltage, and voltage fluctuations relative to $V_{PDNOM}$; accentuating the voltage fluctuations of the modulation envelope relative to $V_{PDNOM}$ by the constant $N_{CONTROL}$ to form an accentuated signal; scaling the accentuated signal to form a control voltage signal $V_{CONTROL}$ that is equal to the nominal value of the control voltage input $V_{PC}$ of the electrical load at the nominal mains voltage; and substituting the control voltage signal $V_{CONTROL}$ for the control voltage input $V_{PC}$ of the electrical load.

The invention in another form is directed to a control circuit for controlling an electrical load exhibiting destabilizing negative resistance negative damping characteristics to provide positive damping of power grid oscillations and for controlling the electrical load to operate at a reduced power level when the power grid voltage is reduced, the electrical load being coupled to an AC mains voltage of a mains supplied by the power grid, and the electrical load having a voltage control input $V_{PC}$ to control the amount of power that is delivered to the load. The control circuit includes a peak detector circuit configured to measure a modulation envelope of the AC mains voltage. The modulation envelope includes a component equal to the peak value $V_{PDNOM}$ of the nominal mains voltage and voltage fluctuations relative to $V_{PDNOM}$. An offset voltage insertion circuit is coupled to the peak detector circuit. The offset voltage insertion circuit is configured to accentuate the voltage fluctuations of the modulation envelope relative to $V_{PDNOM}$ by a constant $N_{CONTROL}$ to form an accentuated signal. An attenuation circuit is coupled to the offset voltage insertion circuit. The attenuation circuit is configured to scale the accentuated signal to form a control voltage signal $V_{CONTROL}$ that is equal to the nominal value of the control voltage input $V_{PC}$ of the electrical load at the nominal mains voltage. The attenuation circuit is configured to substitute the control voltage signal $V_{CONTROL}$ for the control voltage input $V_{PC}$ of the electrical load.

One exemplary advantage of the present invention is that it offers a method and apparatus to reverse the current trend toward massive oscillatory instability of the power grid and offers a method to provide a substantial improvement in terms of stability margin regarding oscillatory instability.

Another advantage is that the present invention provides very simple and low cost design modifications of high-power-factor electronic fluorescent ballasts, LED drivers and motor systems that cause these systems to provide positive damping of oscillatory instability.

Another advantage is that the present invention provides graceful load shedding via grid voltage reduction, whereas the present trend toward the use of constant-power loads inhibits the ability to shed load in that manner. Graceful load shedding via reduction of grid voltage provides a method of peak load shaving that is preferable to rolling blackouts or Smart-Meter on-off control of air conditioners, etc. With the invention the message would be in the mains voltage, therefore, no other form of communication would be required to inform the loads that a reduction in power consumption is needed.

Another advantage is the inherent soft-start characteristic of this form of load shedding will improve the recovery process during power restoration following a fault.

An automatic dimming function is described that allows the flicker susceptibility of high-efficiency lighting to be equal to that of incandescent lamps, in order to maximize positive damping within the constraints of acceptable levels of flicker susceptibility. On a Watt-for-Watt basis, high-efficiency lighting systems that are modified to provide automatic dimming, while limiting flicker susceptibility to be comparable to that of incandescent lamps, provide approximately 2.4 times the positive resistive damping provided by incandescent lamps. Considering the fact that lighting loads constitute approximately twenty-two percent of total grid loading, the potential of the modification to improve the stability margin is quite large.

An automatic speed control for variable-speed drives is described that causes motor speed to vary in proportion to mains voltage to convert this form of constant-power load to provide a positive-resistance, positive-damping characteristic. A majority of motor applications do not require constant motor speed and would therefore permit use of variable speed drives with automatic speed control modification to achieve positive damping. Considering the fact that induction motor loads constitute approximately fifty percent of total grid loading, the potential of the modification to improve the stability margin is quite large.

Unless the present trend toward increased use of constant-power loads is reversed, the power grid will suffer a rapidly increasing tendency toward oscillatory instability. Considering the current state of marginal stability, it appears likely that the power grid will become dysfunctional as a result of more frequent instances of oscillatory instability before conversion of the installed base of incandescent and inductive ballast fluorescent lighting to constant-power negative-resistance negative-damping types has progressed very far.

The lighting load is comprised of hundreds of millions of individual lighting fixtures that are on the threshold of being replaced by costly high-efficiency lighting fixtures. It will be difficult to convince millions of individuals to discard these new high-efficiency lighting fixtures and replace them with yet newer fixtures that also provide damping of power grid oscillation. The constant-power characteristic needs to be mitigated very early in the replacement process.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 10:
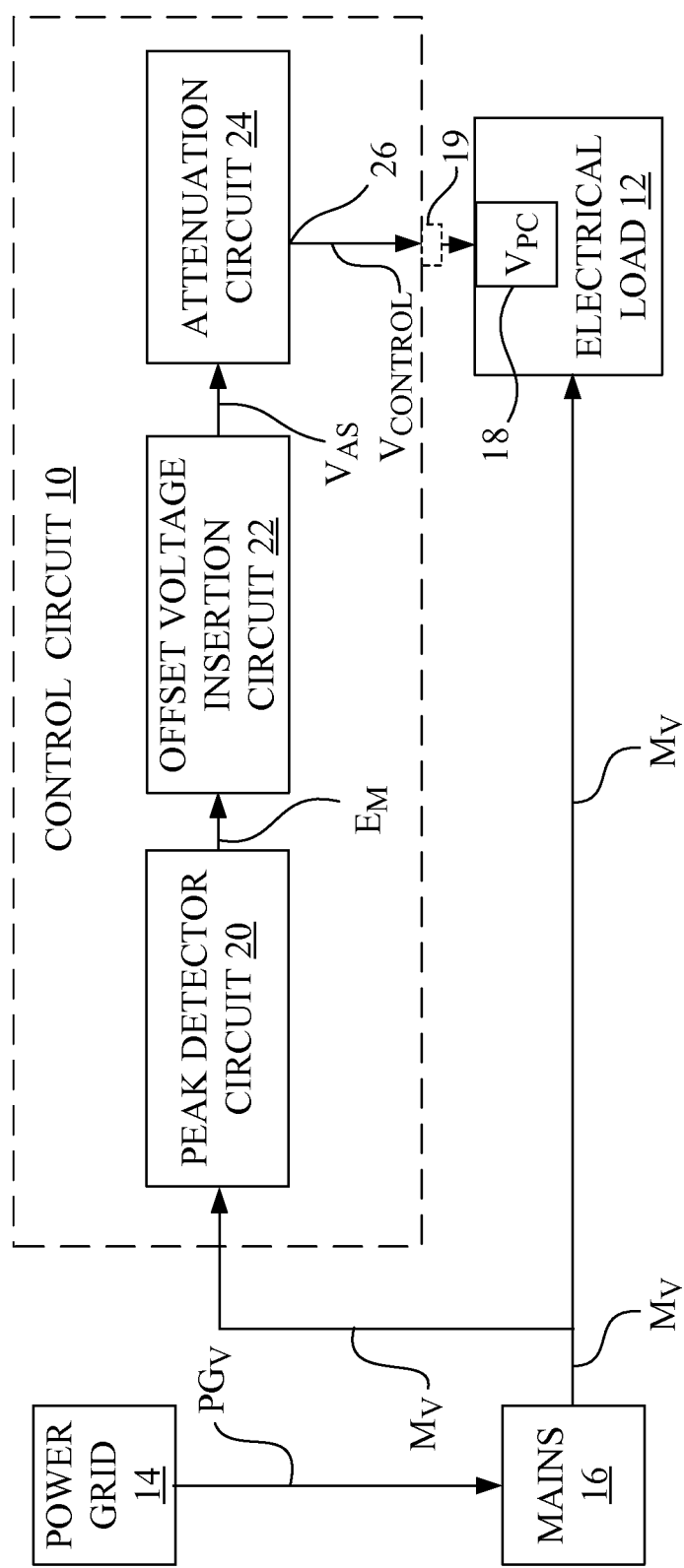
FIG. 10 is a block diagram of an electrical system including a control circuit configured in accordance with the present invention.
Figure 11:
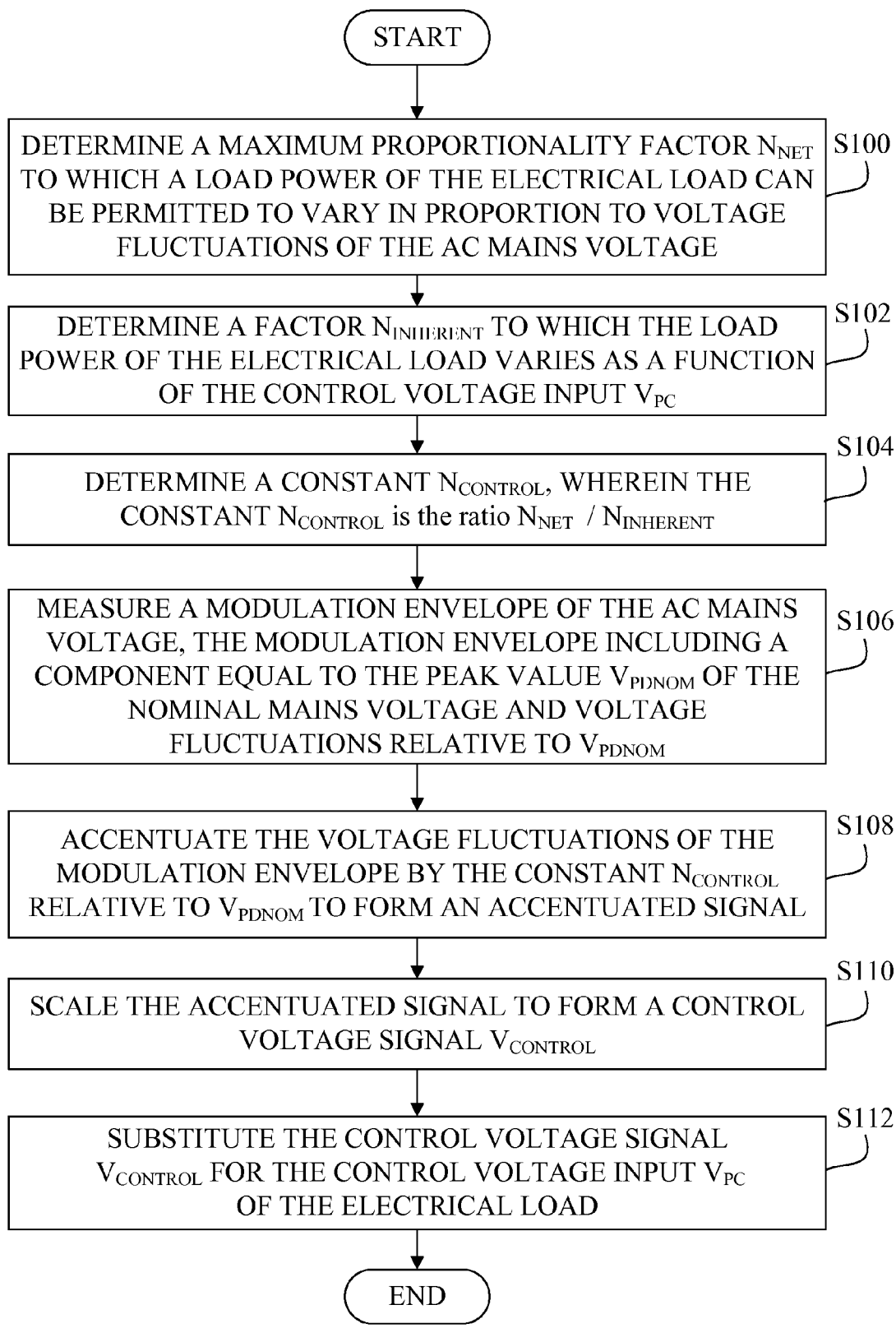
FIG. 11 is a flowchart of a method for controlling an electrical load in accordance with the present invention.

Referring now to the drawings, and more particularly to FIGS. 10 and 11, there is shown a block diagram of a control circuit 10 (FIG. 10) and a flowchart of a method (FIG. 11) of the present invention for controlling an electrical load 12 exhibiting destabilizing negative-resistance negative-damping characteristics to provide positive damping of power grid oscillations of a power grid 14, and for controlling the electrical load 12 to operate at a reduced power level when the AC mains voltage $M_V$ of a mains 16, receiving the power grid voltage $PG_V$ of the power grid 14, is reduced.

Referring to FIG. 10, the electrical load 12 is coupled to the AC mains voltage $M_V$ supplied by the power grid 14 via mains 16. In control circuit 10, whose function is also described by the method of FIG. 11, it is assumed that the electrical load 12 has a control port 18 for a voltage control input as may be configured by attenuation circuit 24, either inherent in existing circuitry or created by circuit modification, to control the amount of power that is delivered to the electrical load 12. In operation, control circuit 10 generates a control voltage signal $V_{CONTROL}$ that is substituted for voltage control input $V_{PC}$ at control port 18 of electrical load 12.

For a particular electrical load not inherently having the control port 18 configured for receiving the control voltage $V_{CONTROL}$, a modification of control circuit 10 may include an interface circuit 19 to translate the characteristics of $V_{CONTROL}$ to be compatible with a control parameter existing within the particular electrical load that is not inherently controllable by a voltage signal configured in the manner of $V_{CONTROL}$, but that does form a parameter that, if varied, will vary the amount of power consumed by the particular electrical load.

As illustrated in FIG. 10, control circuit 10 includes a peak detector circuit 20, an offset voltage insertion circuit 22, and an attenuation circuit 24. Specific exemplary structural configurations for control circuit 10 with respect to particular exemplary electrical loads 12 will follow a general discussion of control circuit 10 of FIG. 10 and the method depicted by the flowchart of FIG. 11.

Peak detector circuit 20 is configured to measure a modulation envelope $E_M$ of the AC mains voltage $M_V$. The modulation envelope $E_M$ includes a component equal to the peak value $V_{PDNOM}$ of a nominal mains voltage of mains 16, and voltage fluctuations relative to $V_{PDNOM}$. The modulation envelope $E_M$ is supplied to offset voltage insertion circuit 22.

Offset voltage insertion circuit 22 is electrically coupled to peak detector circuit 20. Offset voltage insertion circuit 22 is configured to sum an offset voltage $V_{OFFSET}$ with the modulation envelope $E_M$ supplied by peak detector circuit 20. Offset voltage insertion circuit 22 typically causes a negative voltage to be inserted in the signal path between peak detector circuit 20 and an output of the attenuation circuit 24, and is configured to accentuate the voltage fluctuations of the modulation envelope $E_M$ by a constant $N_{CONTROL}$ relative to $V_{PDNOM}$ to form an accentuated signal $V_{AS}$, which is supplied to attenuation circuit 24.

Attenuation circuit 24 is electrically coupled to the offset voltage insertion circuit 22. Attenuation circuit 24 includes a control output 26 that is configured to be electrically coupled to the control port 18 for control voltage input $V_{PC}$ of electrical load 12. Attenuation circuit 24 is configured to scale the accentuated signal to form an attenuated signal as control voltage signal $V_{CONTROL}$ of control circuit 10, which is equal to the nominal value of the control voltage input $V_{PC}$ of electrical load 12 at the nominal mains voltage of mains 16. Accordingly, in operation, attenuation circuit 24 is configured to substitute the control voltage signal $V_{CONTROL}$ for the control voltage input $V_{PC}$ at control port 18 of electrical load 12.

Thus, control circuit 10 is configured to provide control for electrical load 12, which exhibits destabilizing negative-resistance negative-damping characteristics, to provide positive damping of power grid oscillations, and control circuit 10 is configured to control the electrical load 12 to operate at a reduced power level when the AC mains voltage $M_V$ is reduced. Accordingly, control circuit 10 respectively causes the electrical load 12 to consume more or less power when fluctuations cause momentary increases or decreases of the AC mains voltage $M_V$ and/or to operate at a lower average power level when the average mains voltage is reduced.

The method depicted by the flowchart of FIG. 11 provides a functional description of control circuit 10 in relation to the electrical load 12, power grid 14 and mains 16.

In FIG. 11, steps S100 and S102, the values of $N_{NET}$ and $N_{INHERENT}$ are determined by analysis. In step S104, the value of $N_{CONTROL}$ is determined. Step S106 is implemented by peak detector circuit 20.

At step S100, a maximum proportionality factor $N_{NET}$ to which a load power of the electrical load 12 can be permitted to vary in proportion to voltage fluctuations of the AC mains voltage $M_V$ is determined. The load power is the power applied to, or consumed by, electrical load 12. The determination at step S100 may be made, for example, from an analysis of the characteristics of electrical load 12, and the performance requirements of the particular type of application, e.g., lighting control, emergency lighting requirements, motor control, noise, vibration, etc.

At step S102, a factor $N_{INHERENT}$ to which the load power of the electrical load 12 varies as a function of the control voltage input $V_{PC}$ is determined. This determination may be made based on the analysis of the characteristics of electrical load 12.

At step S104, a constant $N_{CONTROL}$ is determined, wherein the constant $N_{CONTROL}$ is the ratio of the proportionality factor $N_{NET}$ and the factor $N_{INHERENT}$, such that $N_{CONTROL}=N_{NET}/N_{INHERENT}$.

At step S106, a modulation envelope $E_M$ of the AC mains voltage $M_V$ is measured. The modulation envelope $E_M$ includes a component equal to the peak value $V_{PDNOM}$ of the nominal mains voltage of mains 16, and voltage fluctuations relative to $V_{PDNOM}$. In a preferred embodiment, the measuring of the modulation envelope of the AC mains voltage $M_V$ is at each peak of the AC mains voltage $M_V$ at successive instants occurring at multiples of the mains frequency of the AC mains voltage $M_V$.

Based on the operation of offset voltage insertion circuit 22, at step S108, the voltage fluctuations of the modulation envelope $E_M$ relative to $V_{PDNOM}$ are accentuated by the constant $N_{CONTROL}$ to form an accentuated signal $V_{AS}$. In order to form the accentuated signal $V_{AS}$, per EQ.8 an offset voltage $V_{OFFSET}$ is calculated as: $V_{OFFSET}=V_{PDNOM}\times(1-1/N_{CONTROL})$, and $V_{OFFSET}$ is inserted into offset voltage insertion circuit 22 for combination with the modulation envelope $E_M$.

At step S110, the accentuated signal $V_{AS}$ is scaled by attenuation circuit 24 to form a control voltage signal $V_{CONTROL}$ that is equal to the nominal value of the control voltage input $V_{PC}$ of electrical load 12 at the nominal mains voltage.

At step S112, the control voltage signal $V_{CONTROL}$ is substituted for the control voltage input $V_{PC}$ of the electrical load 12.

Fundamental system characteristics may provide an inherent exponential response to mains voltage variation or control signal variation. In the case of the incandescent lamp, EQ.3 indicates that the luminous intensity of the incandescent lamp varies exponentially as the 3.45 power of the applied AC mains voltage $M_V$. As discussed herein, some forms of high efficiency lighting may have an inherent exponential response downstream of the control signal insertion point. Variable speed drives may have an exponential response to the control voltage that depends upon the mode of operation. In such systems, the exponent, N, should be considered as being composed of two parts that comprise the net value of N. A linearized approximation of exponential functions is employed. EQ.6 presents a small-number linear approximation of an exponential function. Oscillatory instability of the power grid involves relatively small fluctuations of AC mains voltage $M_V$. Therefore, the approximation of EQ.6 is very good for the intended purpose.

$$(1+S)^N \approx 1+NS \qquad \text{EQ.6}$$

Where: $S \ll 1.0$

In some systems, "natural power-factor correction" is provided by the use of discontinuous-conduction-mode or critical-conduction-mode fly-back converters that cause the line current, during any conduction cycle, to be proportional to the instantaneous mains voltage. Under those conditions, the power drawn from the mains is proportional to the square of the mains voltage, thereby forming an $N_{INHERENT}=2$, if operated with the feedback loop open. The "natural power-factor correction" characteristic exists in open or closed loop operation. With the $N_{INHERENT}$ equal to 2.0, an $N_{CONTROL}$ of only 1.725 is required to achieve an $N_{NET}=3.45$ that is desired for maximum damping in lighting systems. Lighting controllers typically close a feedback loop to convert the lighting system into a constant-power load.

EQ.7 splits N into two parts that form the net N value. $N_{CONTROL}$ is the approximated exponent, obtained by $V_{OFFSET}$ insertion at offset voltage insertion circuit 22, that is applied via the control point used to obtain the desired $N_{NET}$. It is noted that EQ.6 provides a linear approximation of the exponential function in the vicinity of the nominal mains voltage operating point. As a result, a combination of N-factors should be formed by multiplication of the factors rather than summation, as would be appropriate for true exponents, and as is shown in EQ.7, $N_{INHERENT}$ may, or may not be a true exponential function. If so, it is treated in EQ.7 as a simple numeric. Voltage fluctuations of one percent of the mains voltage cause fluctuations of one percent at the peak detector output. With $V_{OFFSET}$ inserted, voltage fluctuations of one percent of the mains voltage cause fluctuations of $N_{CONTROL}$ percent at the Sum output (see, e.g. FIG. 16) of the offset voltage insertion circuit 22. At the output of the Sum, the voltage associated with $V_{PDNOM}$ is reduced by $V_{OFFSET}$, whereas the mains voltage fluctuations in the envelope $E_M$ pass through the Sum without attenuation. Thus, the fluctuations are accentuated at the Sum output relative to their relationship at the peak detector output.

$$N_{NET}=N_{INHERENT}\times N_{CONTROL} \qquad \text{EQ.7}$$

$$V_{OFFSET}=-V_{PD}\times(1-1/N_{CONTROL}) \qquad \text{EQ.8}$$

$$N_{CONTROL}=V_{PD}/V_{SUM} \qquad \text{EQ.9}$$

Where $V_{PD}$ and $V_{SUM}$ occur under
nominal mains voltage conditions

An attenuation factor is computed, in accordance with EQ.10, for use in attenuation circuit 24 to scale the accentuated signal $V_{AS}$ produced by offset voltage insertion circuit 22 to cause a nominal mains voltage condition to produce a nominal system output condition.

$$\text{Attn}=V_{SUM}/V_{CONTROL} \qquad \text{EQ.10}$$

Where: $V_{SUM}$ and $V_{CONTROL}$ are the steady-state values under
nominal mains voltage and nominal system conditions.

Figure 12:
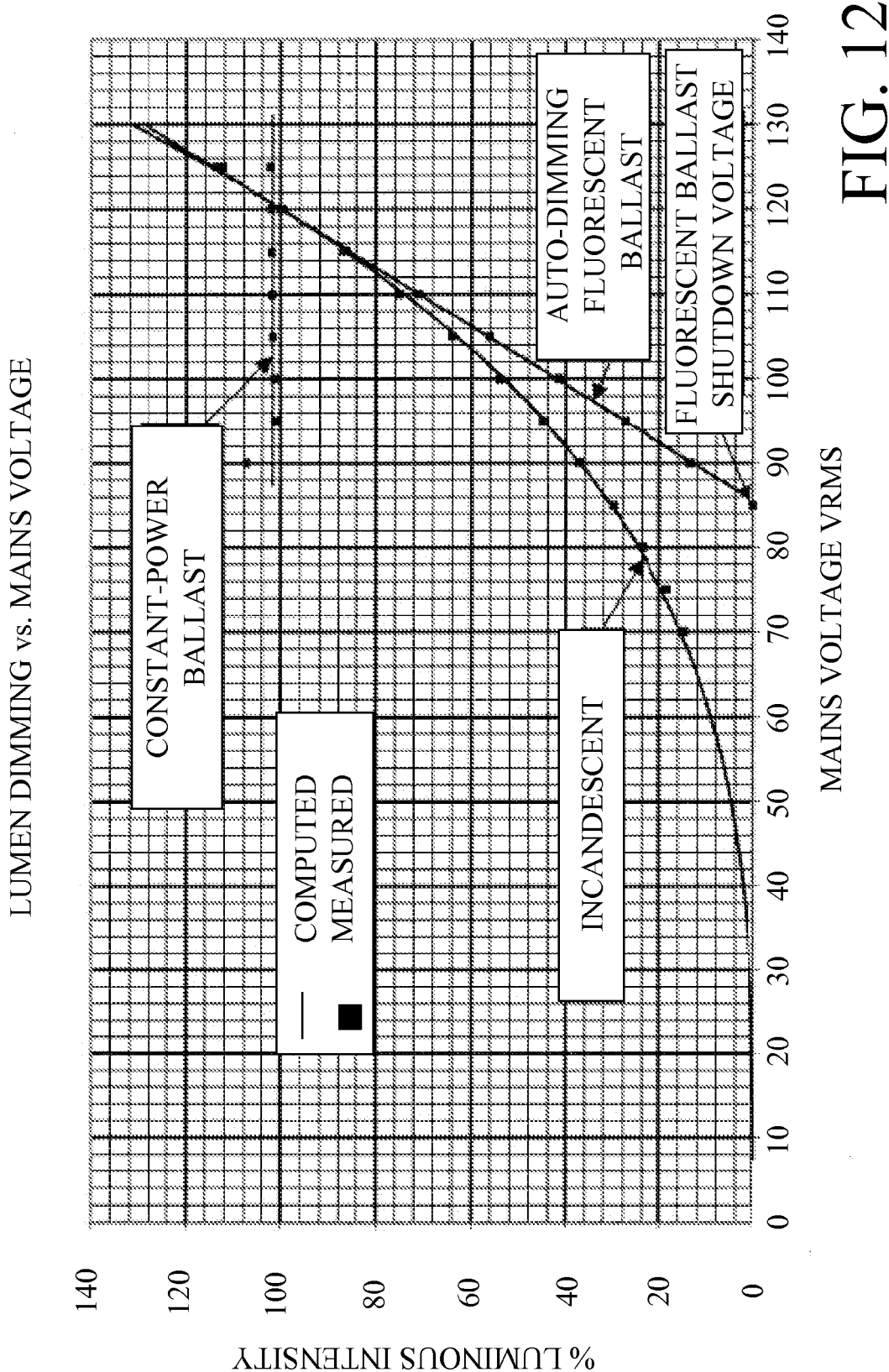
FIG. 12 is a graphical illustration of lumen dimming vs. mains voltage for incandescent lamps, constant-power ballast fluorescent and auto-dimming fluorescent lamps.

FIG. 12 presents a graphical illustration of the operation of the automatic dimming control in dimming luminous intensity as a function of mains voltage for incandescent, and fluorescent lighting systems with constant-power ballast and with auto-dimming ballast. The constant-power data indicates that a constant-power ballast does not provide dimming as the mains voltage is reduced. It simply operates in a constant-power constant-luminous mode until the mains voltage is reduced to a value below the shut-down voltage. FIG. 12 is also representative of the luminous dimming to be expected from LED lighting systems with auto-dimming.

The measured and computed (in accordance with EQ.6) exponential dimming performance of the Incandescent lamp are plotted. EQ.11 restates EQ.3 in terms of percent luminous intensity of an incandescent lamp as a function of the rms mains voltage, for a typical 120 Vrms power system. EQ.12 restates EQ.6 in terms of the rms mains voltage.

$$\text{\% Luminous intensity}=100\times(V_{MAINS}/120\text{ Vrms})^{3.45} \qquad \text{EQ.11}$$

$$\text{\% Luminous intensity}=100\times(V_{MAINS}/120\text{ Vrms})\times(1+3.45S) \qquad \text{EQ.12}$$

Where: S is the fractional value of $V_{MAINS}$ variation

FIG. 12 also illustrates implementation of the $V_{OFFSET}$ insertion function of EQ.8. The slope of the Auto-Dimming Fluorescent Ballast computed line is 3.45 times the slope of a straight line drawn from the origin and intersecting the point representing 100% luminous intensity at $V_{MAINS}=120$ Vrms.

EQ.13 expresses the $V_{OFFSET}$ insertion function, in accordance with EQ.8, but restated in terms of Vrms, rather than $V_{PD}$:

$$V_{OFFSET} = -V_{MAINS} \times (1 - 1/3.45) = 85.2 \text{ Vrms} \qquad \text{EQ.13}$$

It is noted that the Auto-Dimming Fluorescent Ballast computed line of FIG. 12 intersects the X axis at 85.2 Vrms.

Figure 13:
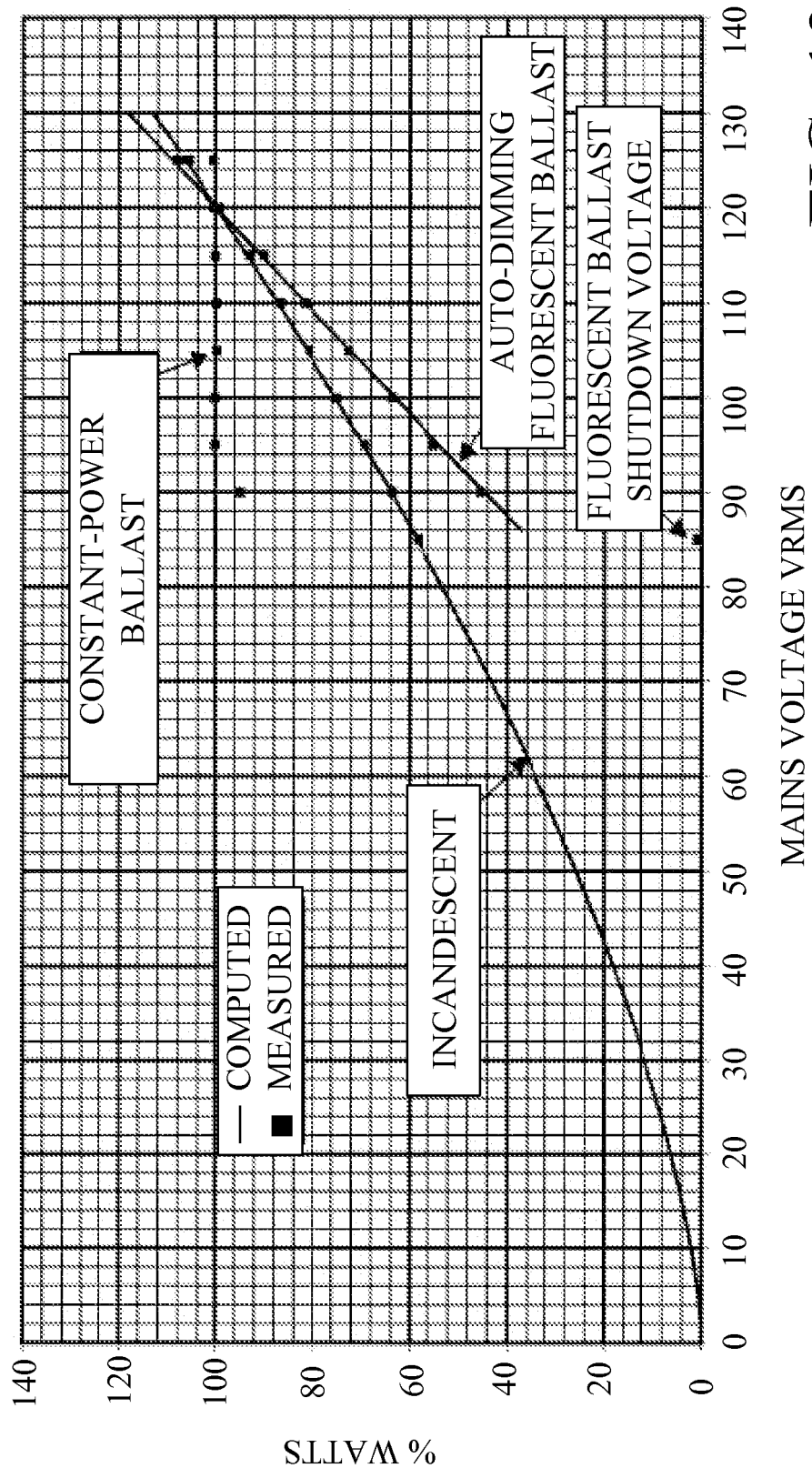
FIG. 13 is a graphical illustration of the load shedding vs. mains voltage for incandescent lamps, constant-power ballast fluorescent and auto-dimming fluorescent lamps.

FIG. 13 presents a graphical illustration of the operation of the automatic dimming control in shedding load as a function of mains voltage for incandescent, and fluorescent lighting systems with constant-power ballast and with auto-dimming ballast. In the vicinity of the nominal mains voltage operating point, 120 Vrms, the Auto-Dimming Fluorescent Ballast sheds load at a rate that is approximately 1.5 times greater than that of the incandescent lamp. FIG. 13 is also representative of the load shedding to be expected from LED lighting systems with auto-dimming.

Specific exemplary structural configurations for control circuit 10 illustrated in FIG. 10 and the method depicted in FIG. 11 with respect to particular exemplary electrical loads 12 follow below.

Figure 14:
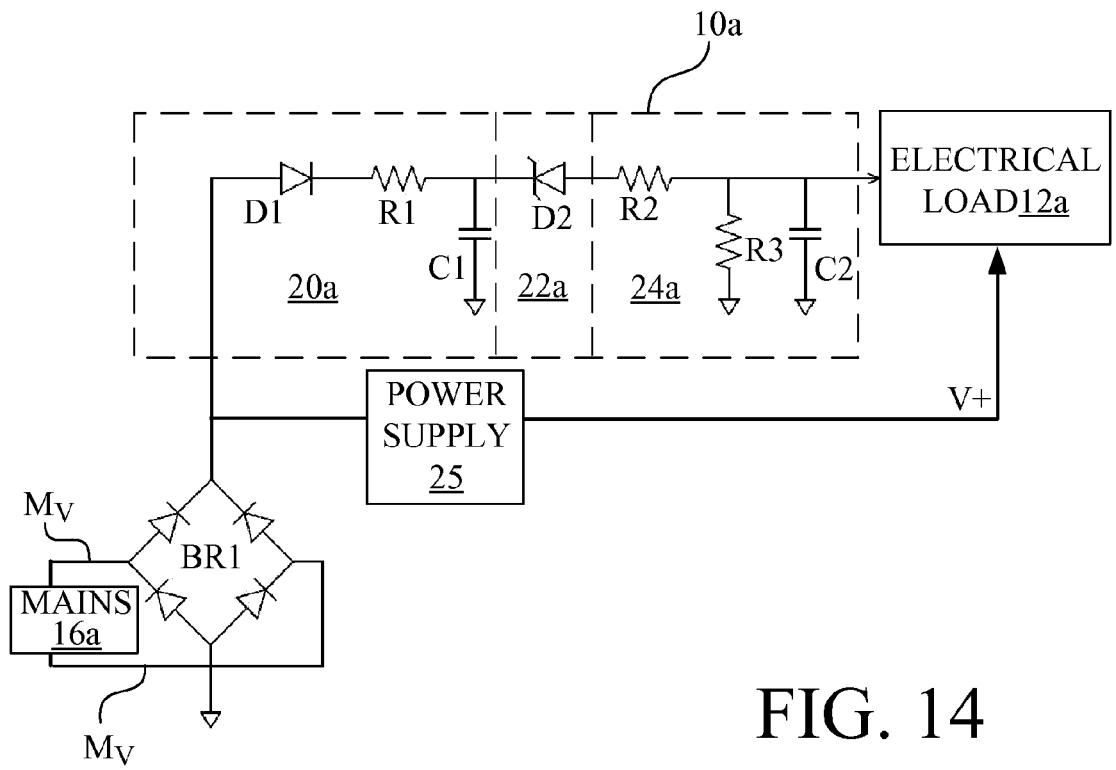
FIG. 14 is a schematic diagram of a control circuit configured in accordance with an embodiment of the invention for controlling an electrical load, wherein a zener diode is used to provide an offset voltage.

FIG. 14 illustrates an exemplary control circuit 10a in association with the electrical load 12a being a Light Emitting Diode (LED) lighting system employing an electronic LED driver. In the Light Emitting Diode (LED) lighting system, the luminous intensity of the light is modulated to cause the power delivered to the electrical load 12a to vary in proportion to the AC mains voltage $M_V$ of mains 16a. For example, the proportionality factor $N_{NET}$ may be selected to provide maximum positive-damping of power grid oscillations while constraining flicker susceptibility of the LED lighting system to be equal to, or less than that of a typical incandescent lamp.

In FIG. 14, it is assumed that the power converter driving the LED's includes a form of power-factor correction that causes the waveform, existing at the junction of the power bridge rectifier BR1 and D1, to approximate the waveform of the absolute value of a sinusoid. Such a waveform would contain large amplitude second harmonics of the mains frequency that could interfere with system operation and could cause significant undesirable lighting flicker at two times the mains frequency, particularly in LED lighting systems. Diode D1 is intended to detect only the peaks of the absolute value of the sinusoid.

FIG. 14 is a schematic diagram of a very simple and low cost implementation of control circuit 10a, which includes the functionality of control circuit 10 described above with respect to FIGS. 10 and 11. Control circuit 10a includes a peak detector circuit 20a, an offset voltage insertion circuit 22a, and an attenuation circuit 24a.

Peak detector circuit 20a includes diode D1, at least one resistor R1 (optional), and a capacitor C1. Diode D1 detects the peaks at the output of the full-wave rectification of the bridge rectifier BR1 that feeds the system controller power supply 25. C1 is charged to store and hold the detected peak value of the detected waveform (modulation envelope). An optional resistor, R1, may be included to reduce the sensitivity of the peak-detector to narrow extraneous noise spikes that may exist on the line voltage waveform.

Offset voltage insertion circuit 22a includes a zener diode, D2. The offset voltage $V_{OFFSET}$ is inserted by a zener diode, D2, which has a zener voltage approximately equal to $V_{OFFSET}$. A current flow in the zener diode D2 will be in the reverse direction that will cause the voltage drop across zener diode D2 to be approximately equal to a specified zener voltage of zener diode D2, and with the specified zener voltage being approximately equal to the intended offset voltage $V_{OFFSET}$.

Attenuation circuit 24a includes resistors R2 and R3, and a capacitor C2 (optional). Resistors R2 and R3 form attenuation. The ratio of R2 and R3 is selected to provide the desired degree of attenuation.

Optional capacitor C2, in conjunction with R2 and R3, forms a low-pass filter that attenuates the effect of mains voltage fluctuations on $V_{CONTROL}$ above the cut-off frequency of the filter. Zener diode D2 and resistors R2 and R3 also provide a discharge path for capacitor C1 that allows the detected waveform to follow the negative-going portion of the modulation envelope. The discharge path is configured to slowly discharge the capacitor C1 sufficiently to ensure that a next occurring mains voltage peak will be measured without error occurring as a result of residual voltage persisting from the previously sampled mains voltage peak while sustaining the previously sampled mains voltage peak without excessive error until the subsequent mains voltage peak is detected.

The zero-order hold characteristic of peak detector circuit 20a introduces a small phase shift that increases linearly, from zero, in proportion to modulation frequency. With a peak detector that detects two peaks per mains cycle, operating in a 60 Hz system, the phase shift at a modulation frequency of 10 Hz is only 15 degrees. The offset voltage is inserted by zener diode, D2, having a zener voltage approximately equal to $V_{OFFSET}$.

Figure 15:
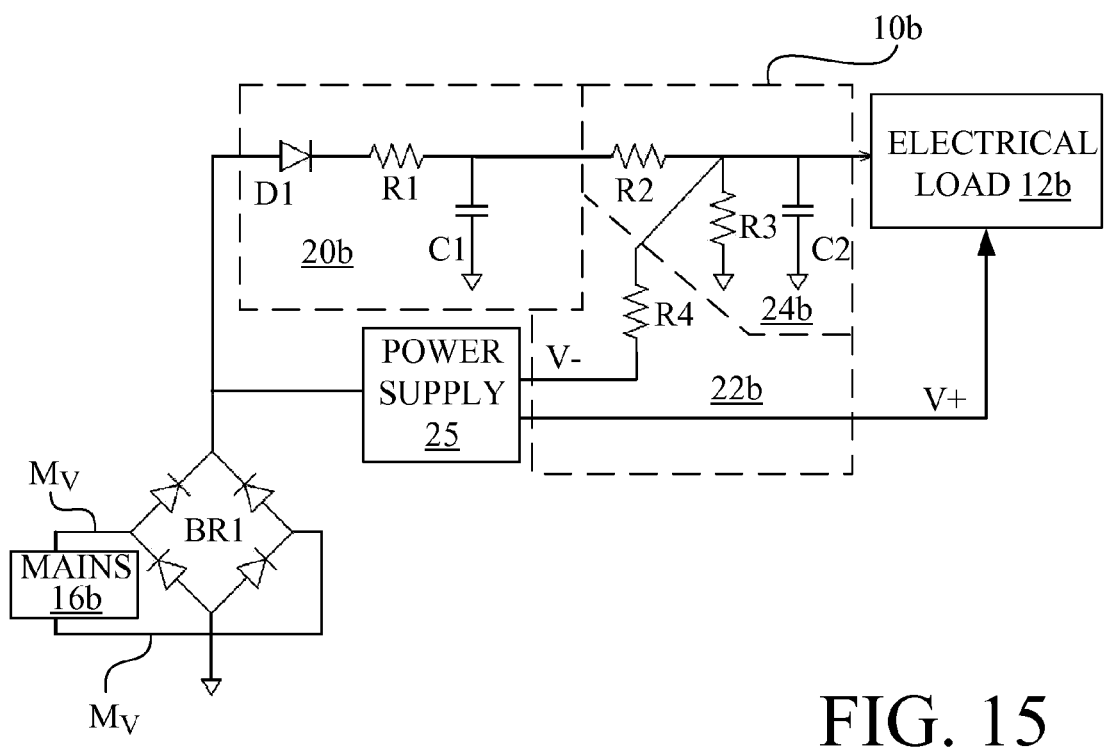
FIG. 15 is a schematic diagram of a control circuit configured in accordance with an embodiment of the invention for controlling an electrical load, wherein a negative voltage source is used to provide an offset voltage.

FIG. 15 illustrates an exemplary control circuit 10b in association with the electrical load 12b being a fluorescent lighting system employing an electronic ballast, and wherein the luminous intensity of the light is modulated to cause the power delivered to the electrical load 12b to vary in proportion to the mains voltage of mains 16b. In the fluorescent lighting system, the proportionality factor $N_{NET}$ may be selected to provide maximum positive-damping of power grid oscillations while constraining flicker susceptibility of the fluorescent lighting system to be equal to, or less than that of a typical incandescent lamp.

FIG. 15 illustrates, in schematic form, a control circuit 10b as an alternative implementation of the automatic control function for systems wherein the system controller power supply 25 provides a well-regulated negative voltage, V− that may be used, in conjunction with R4 to form $V_{OFFSET}$. Control circuit 10b includes the functionality of control circuit 10 described above with respect to FIGS. 10 and 11. Control circuit 10b includes a peak detector circuit 20b, an offset voltage insertion circuit 22b, and an attenuation circuit 24b.

Peak detector circuit 20b includes diode D1, resistor R1 (optional), and a capacitor C1. Diode D1 detects the peaks at the output of the full-wave rectification of the bridge rectifier BR1 that feeds the system controller power supply 25. C1 holds the peak value of the detected waveform (modulation envelope). An optional resistor, R1, may be included to reduce the sensitivity of the peak-detector to narrow extraneous noise spikes that may exist on the line voltage waveform.

Offset voltage insertion circuit 22b inserts offset voltage $V_{OFFSET}$ by using V−, in conjunction with R4 to sum a fixed negative voltage in the attenuator signal path of attenuation circuit 24b, rather than using a zener diode for this purpose as in FIG. 14. Offset voltage insertion circuit 22b includes a resistor R4 that is connected between the well regulated negative voltage source 25 and the junction of resistors R2 and R3 of attenuation circuit 24b. Resistors R2, R3 and R4 form the attenuation and also provide the discharge path for capacitor C1. Attenuation circuit 24b further includes an optional capacitor C2 that, in conjunction with R2, R3 and R4, form a low-pass filter as in FIG. 14.

The value of R4 of offset voltage insertion circuit 22b is selected, in conjunction with the values of resistors R2 and R3 of attenuation circuit 24b, to cause an offset voltage V2$_{OFFSET}$ to be inserted at the V$_{CONTROL}$ terminal determined in accordance with EQ.14. R2, R3 and 4 also form a discharge path for C1 that allows the detected waveform to follow the negative-going portion of the modulation envelope.

Using a well regulated negative voltage V− for V$_{OFFSET}$ insertion typically would be preferable to the use of a zener diode because it provides a more accurate control of V$_{OFFSET}$. For R4, resistors are readily available with resistance values within one percent of the desired value, whereas zener diodes are more expensive and readily available values have five or ten percent tolerance. However, LED drivers and electronic fluorescent ballasts tend to employ single, positive voltage power supplies in order to minimize cost.

$$V2_{OFFSET} = V_{OFFSET}/\text{Attn} \qquad \text{EQ.14}$$

Figure 16:
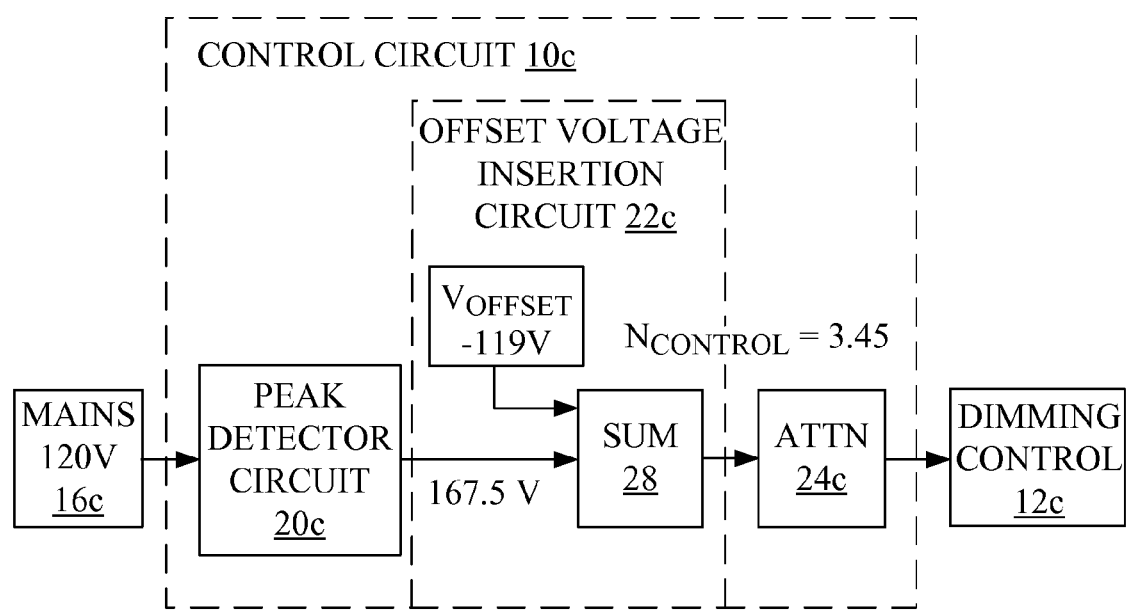
FIG. 16 is a block diagram of a control circuit configured in accordance with an embodiment of the invention to provide an automatic dimming function for a fluorescent ballast or LED driver controller that has a typical analog dimming input.

FIG. 16 illustrates, in block diagram form, a control circuit 10c that includes the functionality of control circuit 10 described above with respect to FIGS. 10 and 11. Control circuit 10c includes a peak detector circuit 20c, an offset voltage insertion circuit 22c, and an attenuation circuit 24c. Mains 16c is electrically coupled to peak detector circuit 20c. Offset voltage insertion circuit 22c includes a voltage of −119.5V for V$_{OFFSET}$ in accordance with EQ.8 and the indicated N$_{CONTROL}$=3.45, and a summing circuit 28. The control circuit 10c required to perform the functions of FIG. 16 may be equivalent to that of FIG. 14.

Control circuit 10c is used in association with the electrical load 12c. Electrical load 12c is a dimming control 12c for a fluorescent lighting system having a high power-factor electronic automatic dimming ballast, such as the International Rectifier IRFPLDIM3 dimming ballast reference design evaluation module, wherein the electrical power delivered to the fluorescent lamp is modulated to cause the electrical power delivered to the lamp load to vary in proportion to the mains voltage, and wherein N$_{INHERENT}$=1.0. In the fluorescent lighting system employing a high power-factor electronic automatic dimming ballast, the proportionality factor N$_{NET}$ is selected to result in an V$_{CONTROL}$=3.45 to provide maximum positive-damping of power grid oscillation while not exceeding the flicker susceptibility of incandescent lamps.

Figure 17:
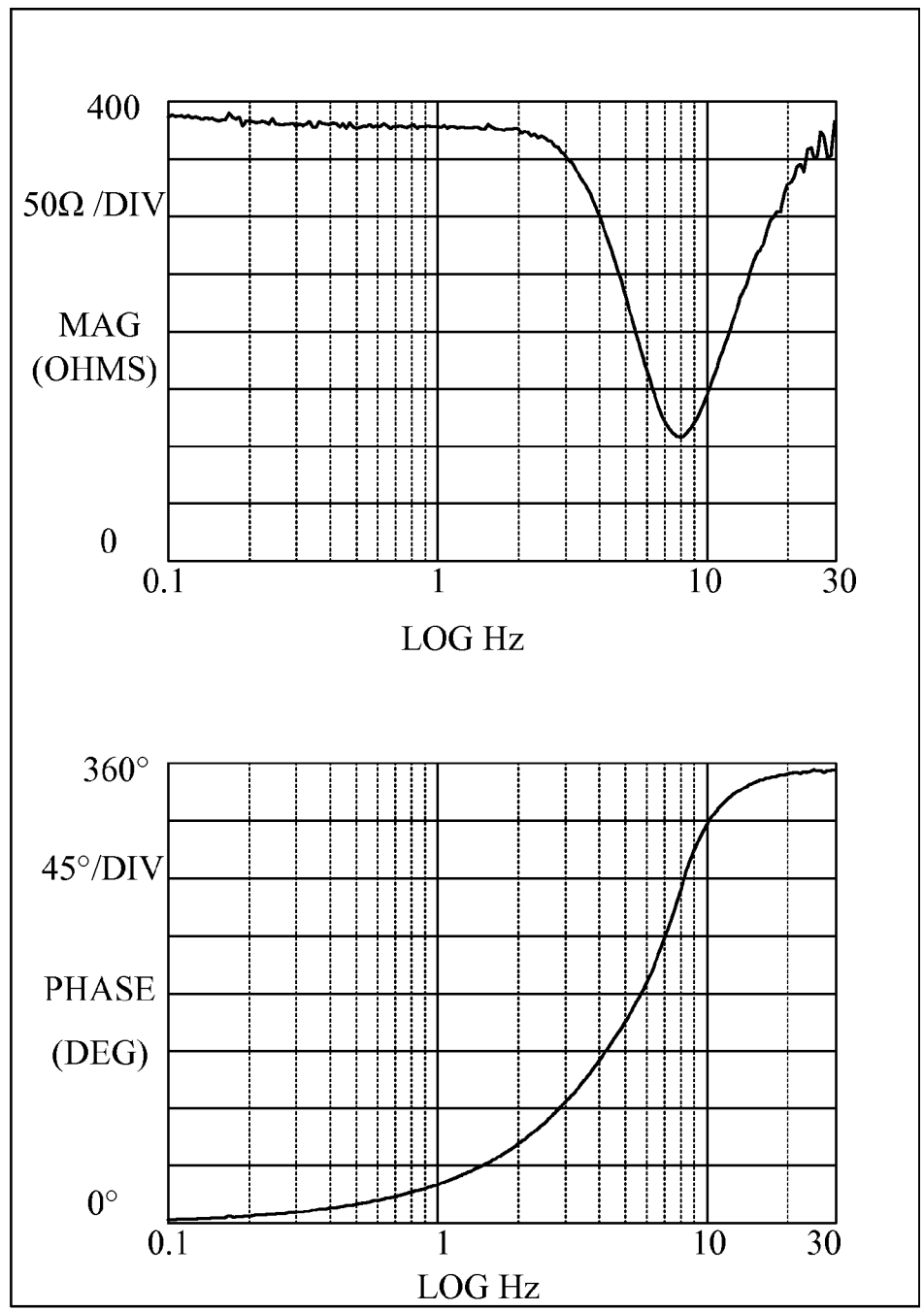
FIG. 17 is a graphical illustration of the suppressed-carrier impedance of a 28 Watt T5 fluorescent light with automatic dimming of high-power-factor electronic ballast.

FIG. 17 is a graphical illustration of the suppressed-carrier impedance of International Rectifier IRFPLDIM3 dimming ballast reference design evaluation module, having an N$_{INHERENT}$=1, with the automatic dimming control included. The modification also provides for graceful load shedding as the line voltage is reduced. A control voltage is applied to an analog dimming pin, of the International Rectifier IRFPLDIM3, that directly controls the luminous intensity. The luminous intensity is controlled in accordance with EQ.15. For maximum damping, N$_{CONTROL}$ was chosen to be equal to 3.45.

$$\text{Luminous Intensity} = K \times V_{DIM} \qquad \text{EQ.15}$$

Where, K is a constant

Figure 1:
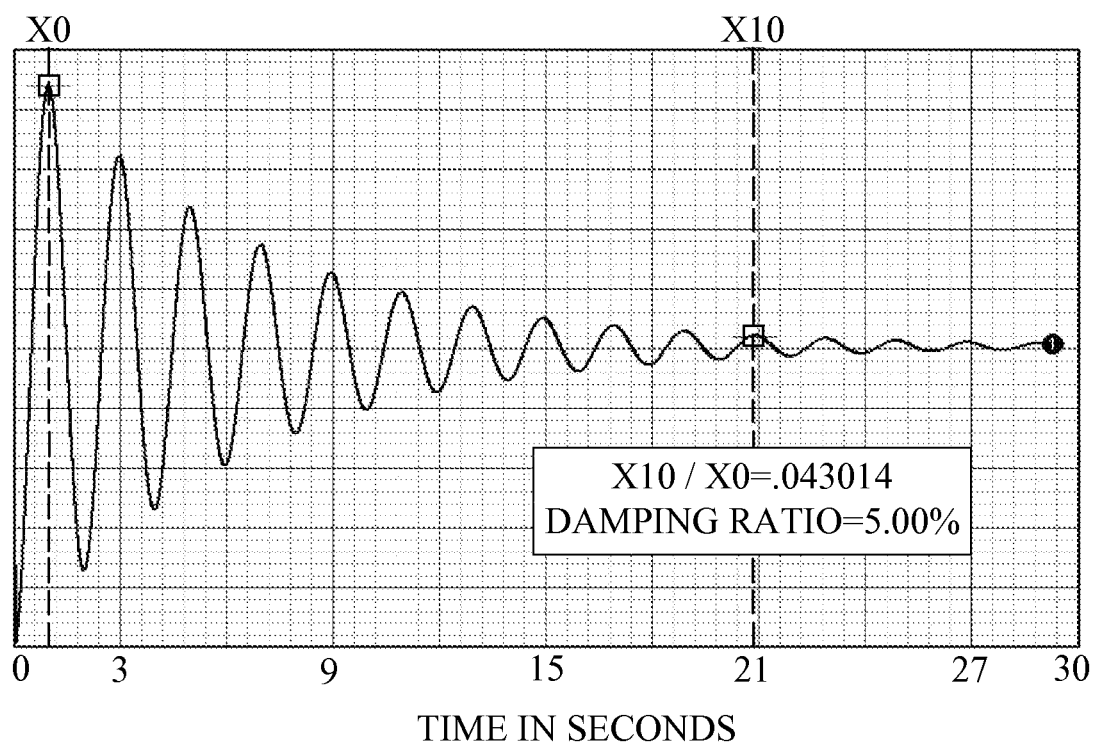
FIG. 1 is a graphical illustration of a damped 0.5 Hz sinusoid with 5% damping ratio "threshold of concern".
Figure 2:
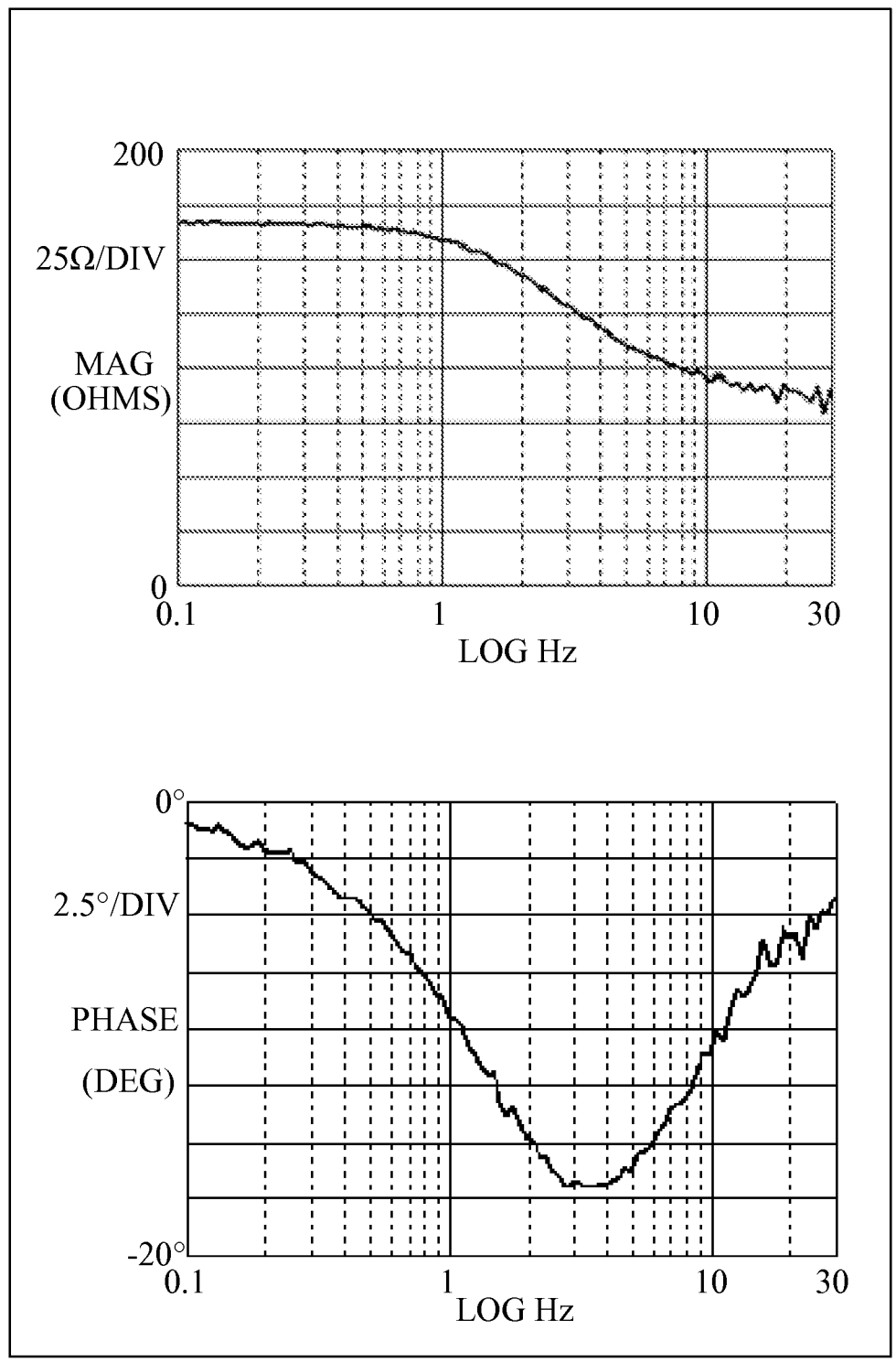
FIG. 2 is a graphical illustration of the suppressed-carrier impedance of a 160 Watt Incandescent lamp.
Figure 3:
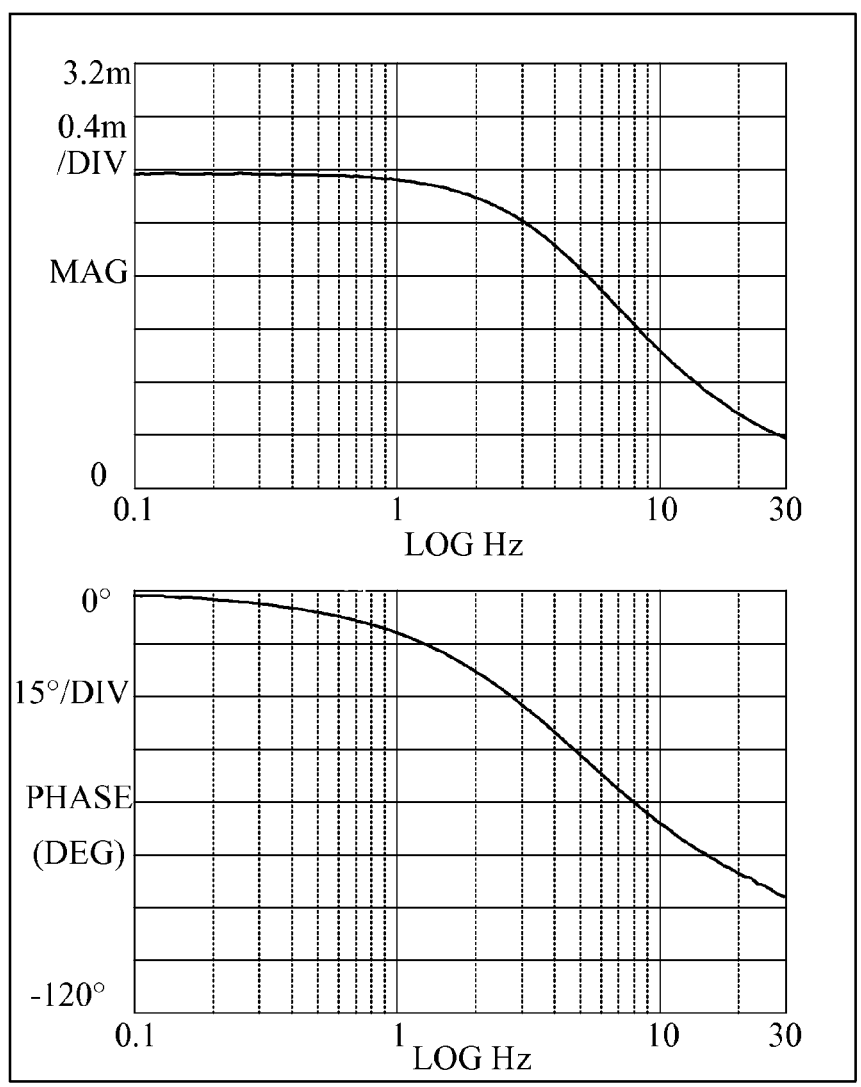
FIG. 3 is a graphical illustration of the flicker susceptibility of a 160 Watt Incandescent lamp.
Figure 4:
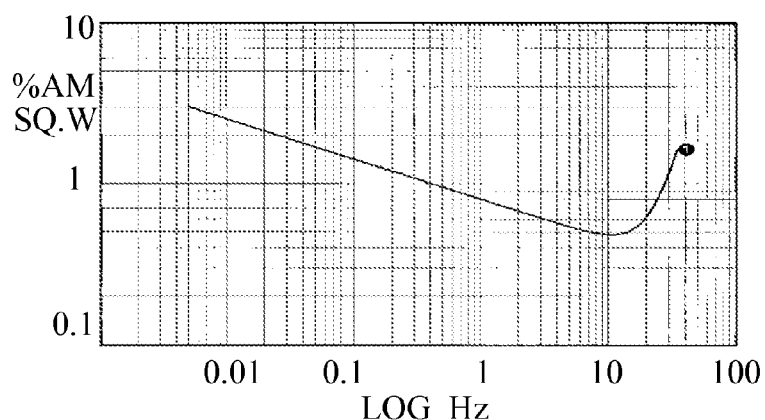
FIG. 4 is a graphical illustration of the IEEE 141 Flicker Threshold for square-wave amplitude modulation of mains voltage.
Figure 5:
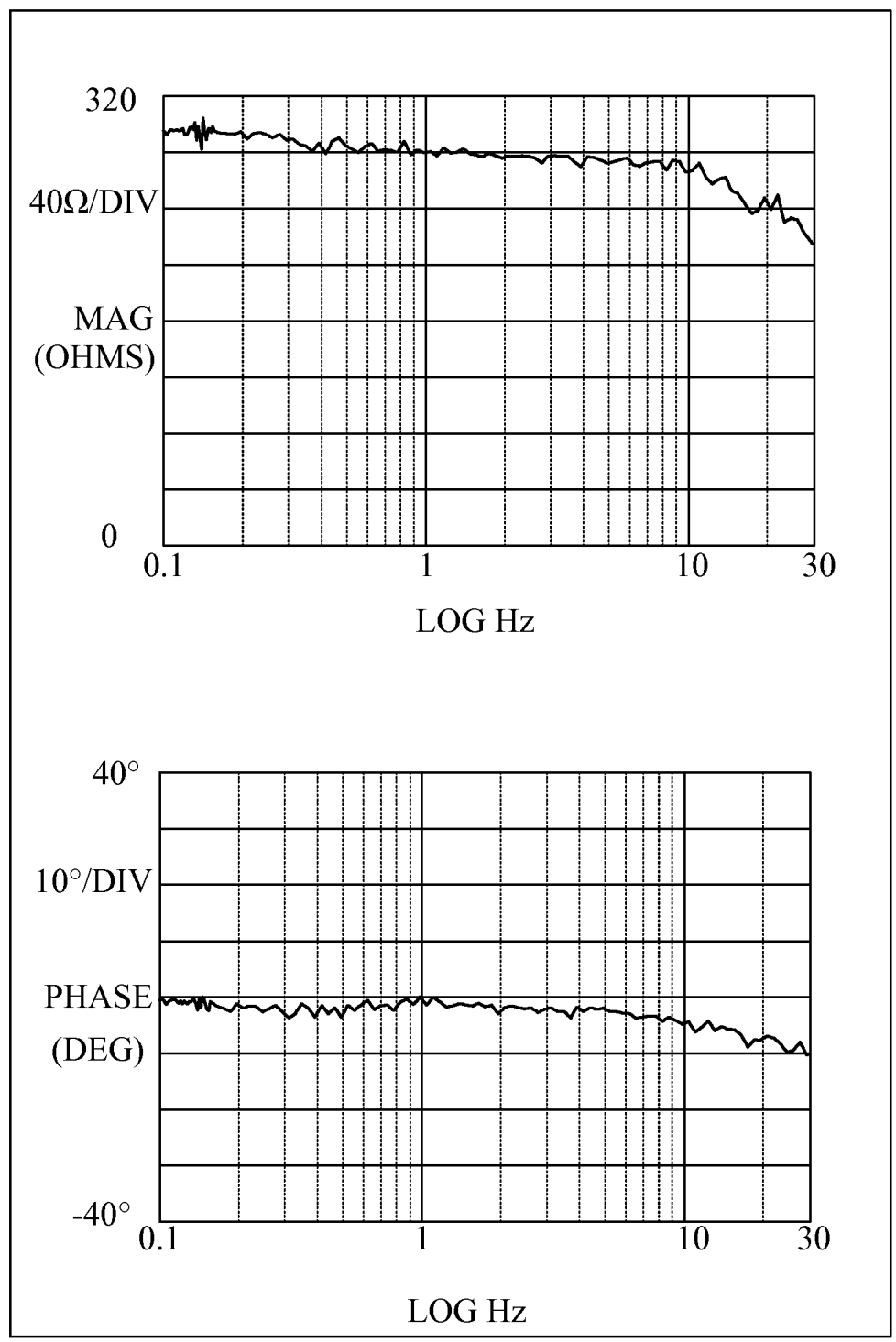
FIG. 5 is a graphical illustration of the suppressed-carrier impedance of a dual 20 Watt T12 fluorescent lamp with inductive ballast.
Figure 6:
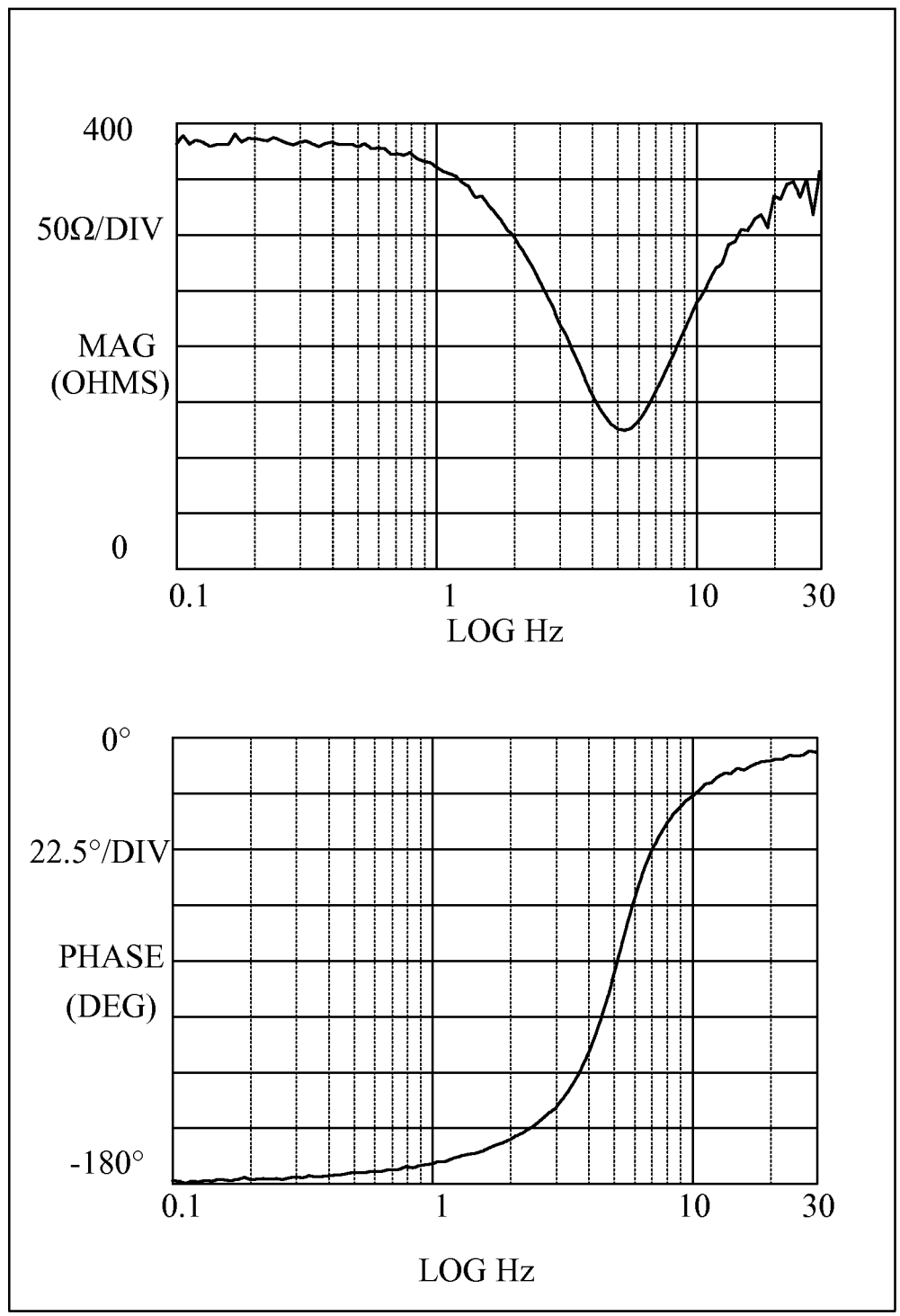
FIG. 6 is a graphical illustration of the suppressed-carrier impedance of a 28 Watt T5 fluorescent lamp with modern high-power-factor electronic ballast.
Figure 7:
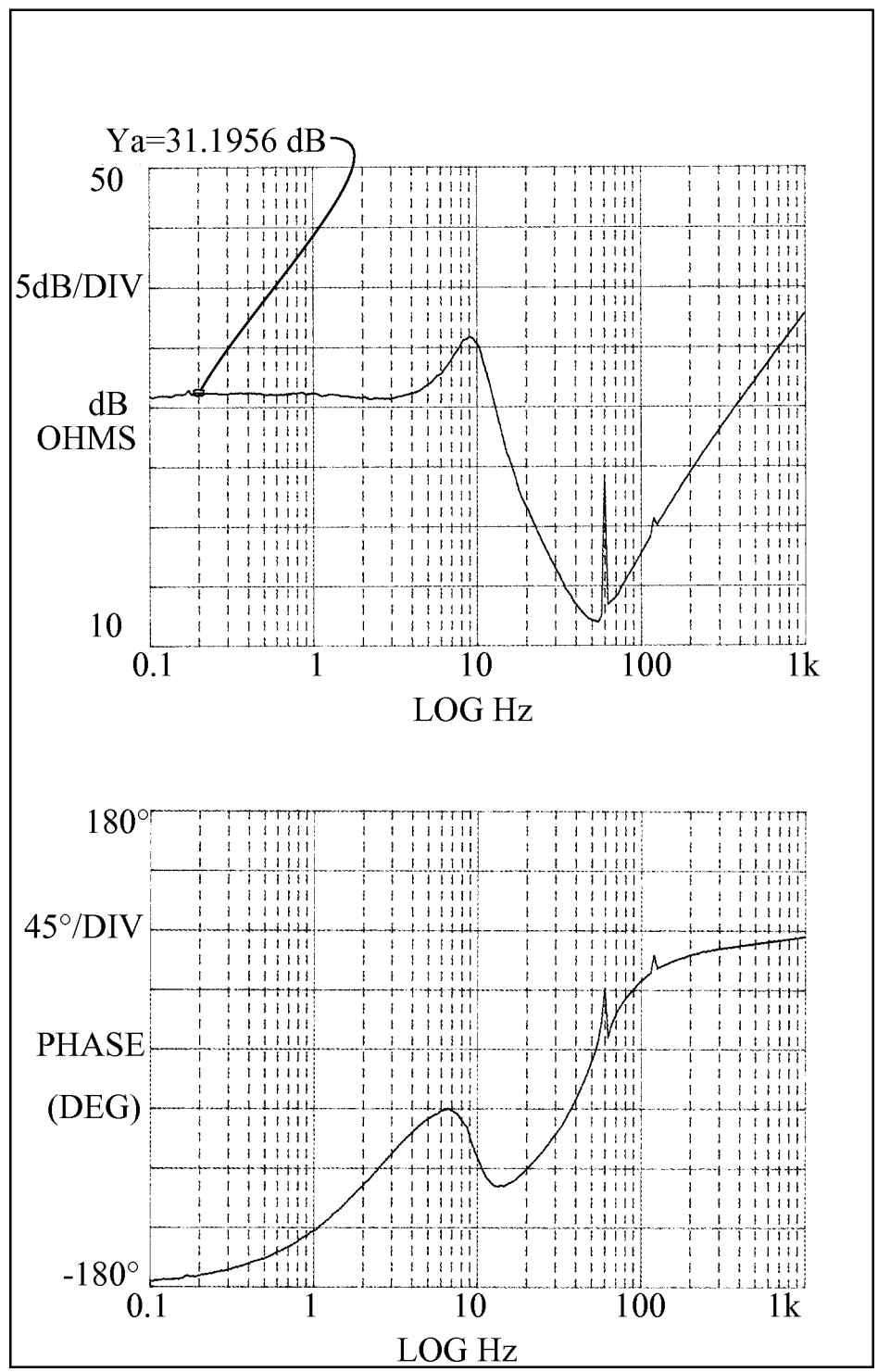
FIG. 7 is a graphical illustration of the suppressed-carrier impedance of a one horsepower three-phase induction motor.
Figure 18:
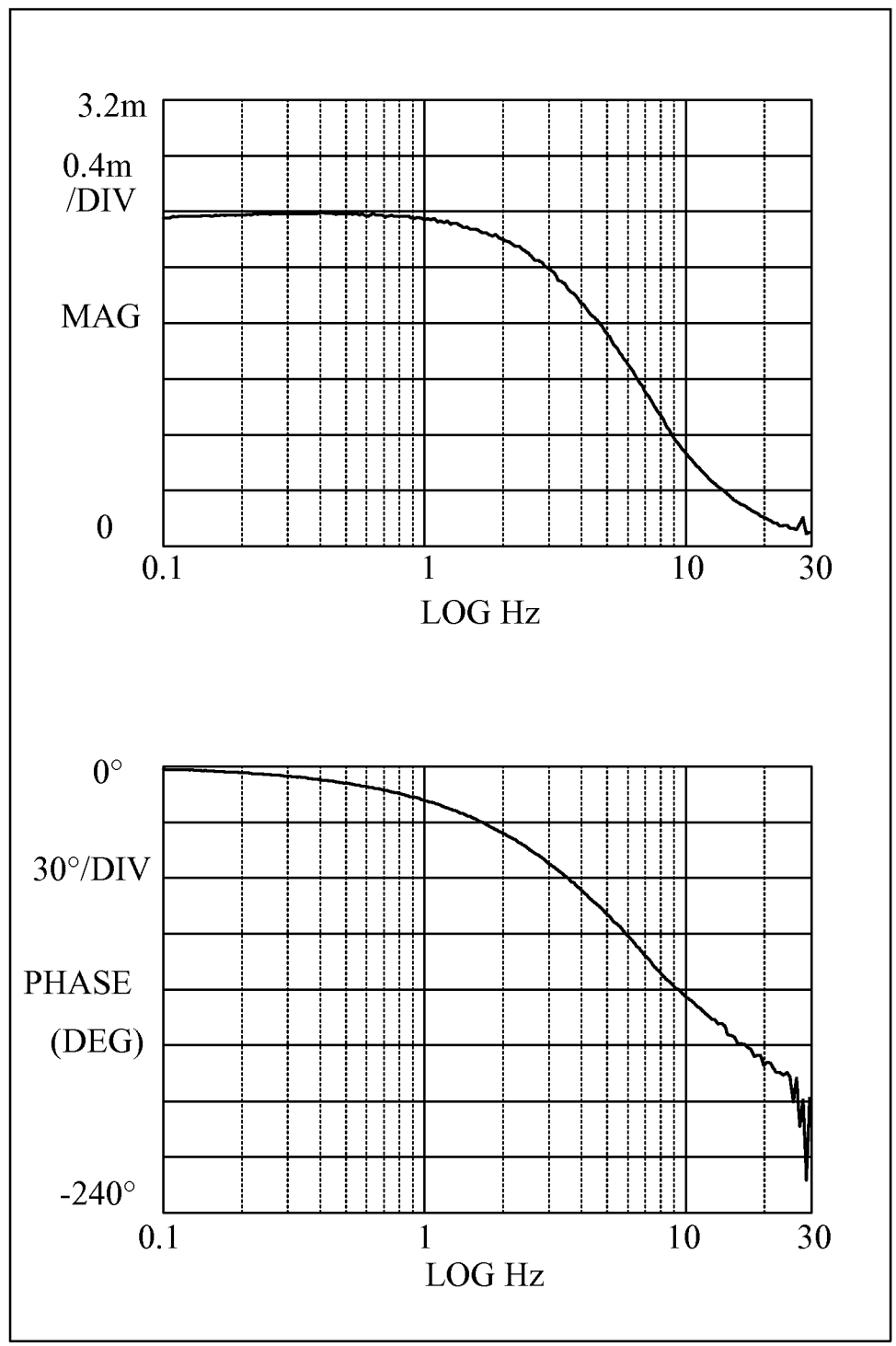
FIG. 18 is a graphical illustration of the flicker susceptibility of a 28 Watt T5 fluorescent light with automatic dimming of high-power-factor electronic ballast.

The near-zero phase angle shown in the data indicates that the input impedance is positive for all modulation frequencies below approximately 3 Hz, FIG. 18 is a graphical illustration of the flicker susceptibility of International Rectifier IRFPLDIM3 dimming ballast reference design evaluation module, having an N$_{INHERENT}$=1, with the automatic dimming control included and designed to have N$_{NET}$=3.45. The data indicates that the flicker susceptibility is approximately equal to that of the incandescent lamp shown in FIG. 3 at all modulation frequencies below 4 Hz, but approximately 40 percent less than that of FIG. 3 at 12 Hz.

Figure 19:
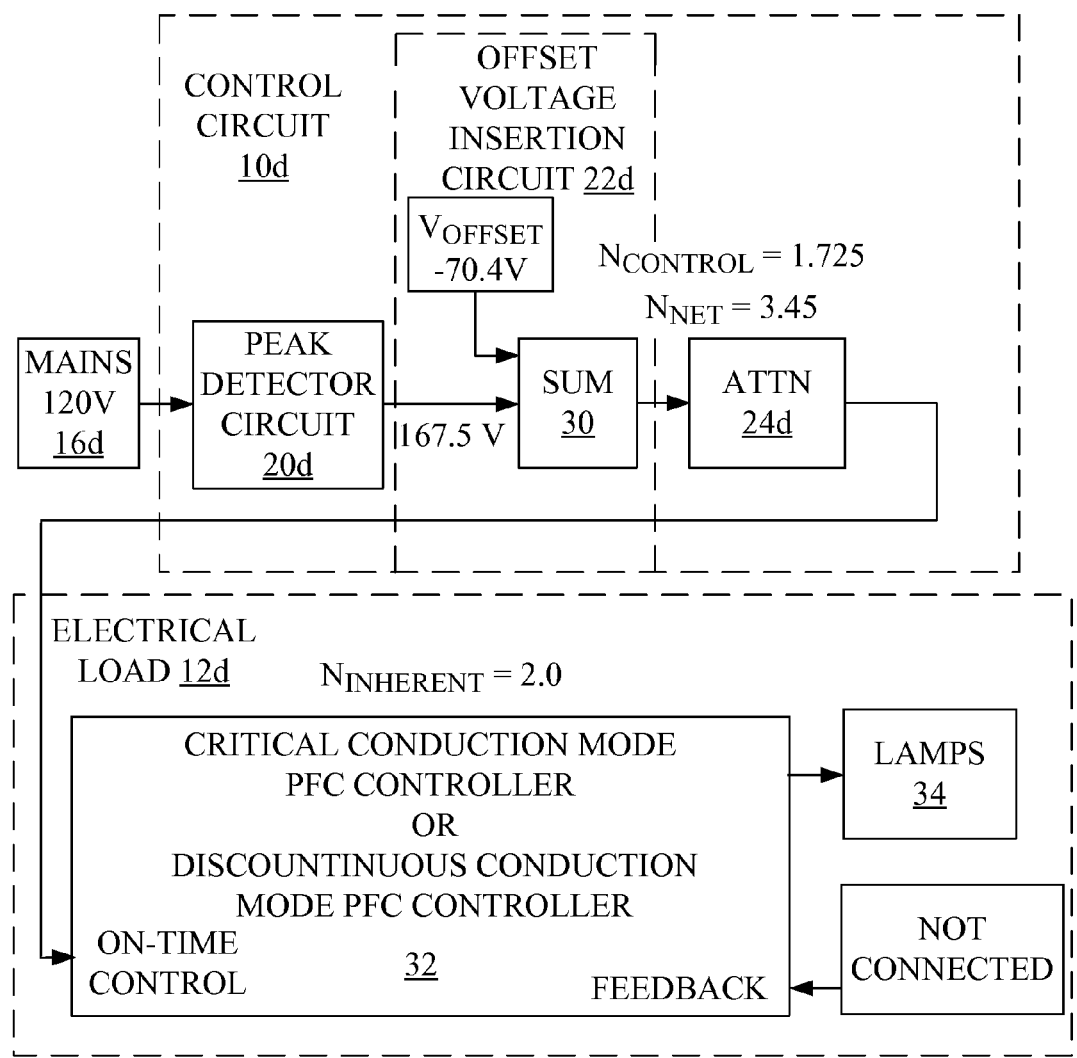
FIG. 19 is a block diagram of a control circuit configured in accordance with an embodiment of the invention to provide automatic dimming of an LED or fluorescent light with a Critical-Conduction-Mode or Discontinuous-Conduction-Mode power converter operating open-loop.

FIG. 19 illustrates, in block diagram form, a control circuit 10d that includes the functionality of control circuit 10 described above with respect to FIGS. 10 and 11. Control circuit 10d includes a peak detector circuit 20d, an offset voltage insertion circuit 22d, and an attenuation circuit 24d. Mains 16d is electrically coupled to peak detector circuit 20d. Offset voltage insertion circuit 22d includes a voltage of −70.4V for V$_{OFFSET}$ and a summing circuit 30.

Control circuit 10d is used in association with the electrical load 12d, which is an LED lighting system powered by a switchmode power converter (PFC controller 32) operating in critical-conduction mode or discontinuous-conduction mode, wherein each of the modes has an N$_{INHERENT}$=2.0, and wherein the power delivered to the light is modulated to cause the electrical power delivered to lighting system to vary in proportion to the mains voltage. PFC controller 32 may be electrically connected to lamps 34. In the automatic-dimming lighting system, the proportionality factor N$_{NET}$ is selected to be 3.45 to provide maximum positive-damping of power grid oscillation while not exceeding the flicker susceptibility of incandescent lamps, and wherein N$_{CONTROL}$ is selected to be equal to 1.725 that, when combined with the N$_{INHERENT}$=2.0, N$_{NET}$ is equal to 3.45.

Figure 20:
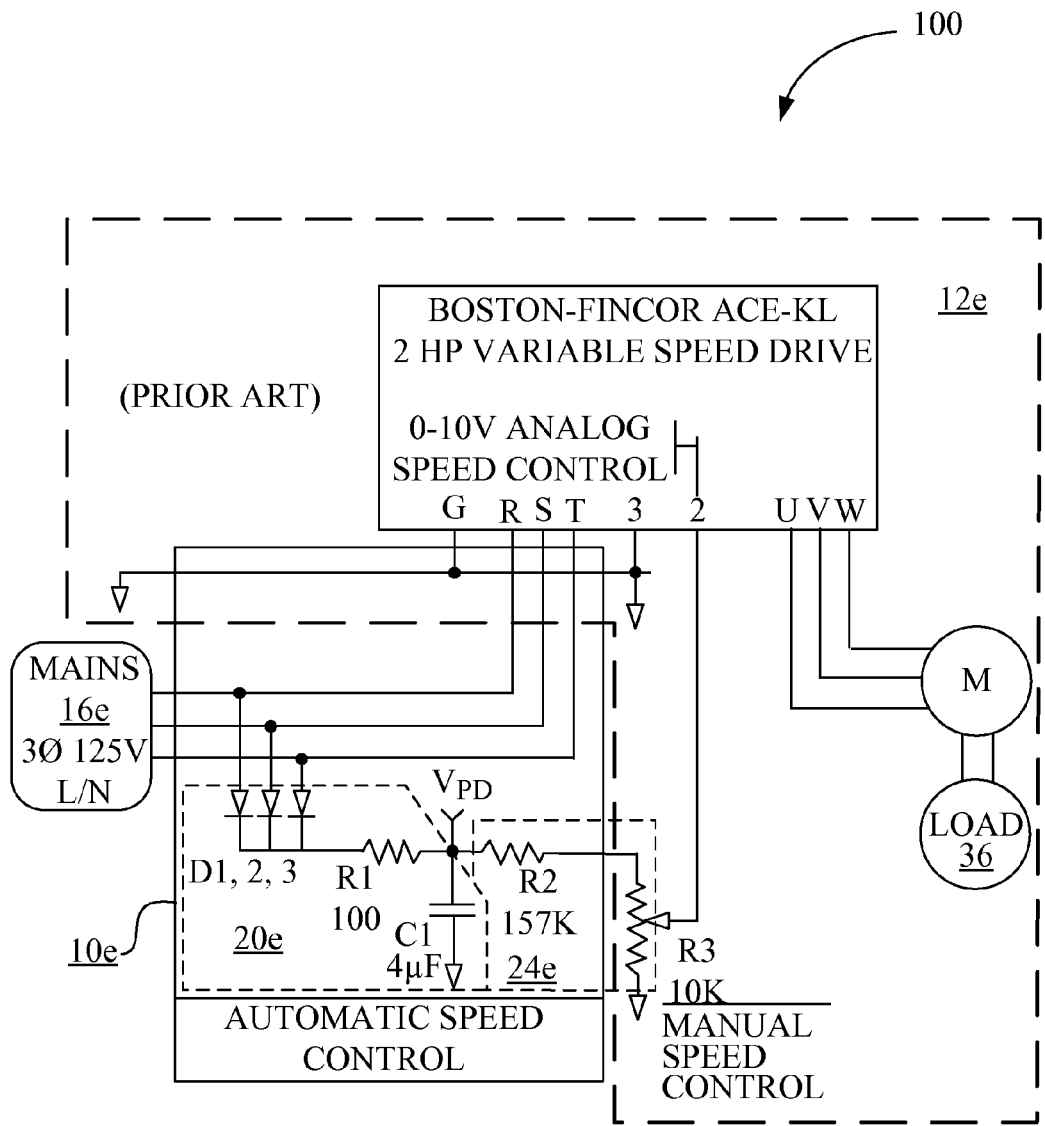
FIG. 20 is a schematic diagram of a control circuit configured in accordance with an embodiment of the invention to provide control for the Boston-Fincor ACE-KL Series 2 HP variable speed drive with Hertz-per-Volt automatic speed control modification.

FIG. 20 presents, in schematic diagram form, a variable-speed motor drive system 100 with modification in accordance with the present invention to include a control circuit 10e that will convert the constant-power negative-resistance negative-damping characteristic to provide a positive-resistance, positive-damping input impedance characteristic. Control circuit 10e includes the functionality of control circuit 10 described above with respect to FIGS. 10 and 11. Control circuit 10e includes a peak detector circuit 20e, and an attenuation circuit 24e. Mains 16e is electrically coupled to peak detector circuit 20e. In this particular exemplary circuit, N$_{CONTROL}$=1.0. N$_{NET}$=N$_{INHERENT}$, and N$_{INHERENT}$ is determined by the operating mode of the VSD. With N$_{CONTROL}$=1.0, V$_{OFFSET}$=0. Therefore, an offset insertion circuit is not required and is not shown.

Peak detector circuit 20e includes diodes D1, 2, 3; optional resistor R1; and capacitor C1. Attenuation circuit 24e is formed by resistors R2 and R3. Resistors R2 and R3 form the discharge path for capacitor C1 of peak detector circuit 20e.

The electrical load 12e is in the form of a prior art Boston-Fincor ACE-KL 2 horsepower variable speed drive electrically coupled to a motor M and its associated rotational load 36.

In variable-speed motor drive system 100, the electrical power delivered to the motor M is modulated to cause the electrical power delivered to the motor M to vary in proportion to the mains voltage of mains 16e. The proportionality factor N$_{NET}$ may be selected to provide maximum positive-damping of power grid oscillation while not exceeding the performance parameter limits of the motor drive system 100.

The modification can be considered to be a Hertz-per-Volt function, wherein motor speed is varied in proportion to mains voltage of the 3-phase 125V line/neutral mains 16e. The normal Volts-per-Hertz function, that varies the motor voltage as a function of motor speed (frequency) to avoid magnetic saturation, is retained. The optimum N$_{NET}$ is a function of the actual motor application. The degree of speed variation associated with mains voltage variation may be limited by the nature of the process powered by the motor or factors such as the acoustic noise, or vibration, resulting from the speed variation. In a true constant-torque mode, $N_{INHERENT}=1$. In the variable-torque mode, $N_{INHERENT}>1$, and may be approximately equal to 2.0. In the case illustrated in FIG. 20, $N_{CONTROL}=1.0$ and $V_{OFFSET}=0$. In this case, the low-frequency input impedance will have a positive-resistance characteristic of value approximately in accordance with EQ.16A if operated in a constant-torque mode, or EQ.16B, if operated in a variable-torque mode that is often used with fans and some pumps.

$$R_{INLN} \approx \sqrt{2} \times V_{RMSLN}^2/(P_{IN}/3) \qquad \text{EQ.16A}$$

$$R_{INLN} \approx V_{RMSLN}^2/(P_{IN}/3) \qquad \text{EQ.16B}$$

Figure 21:
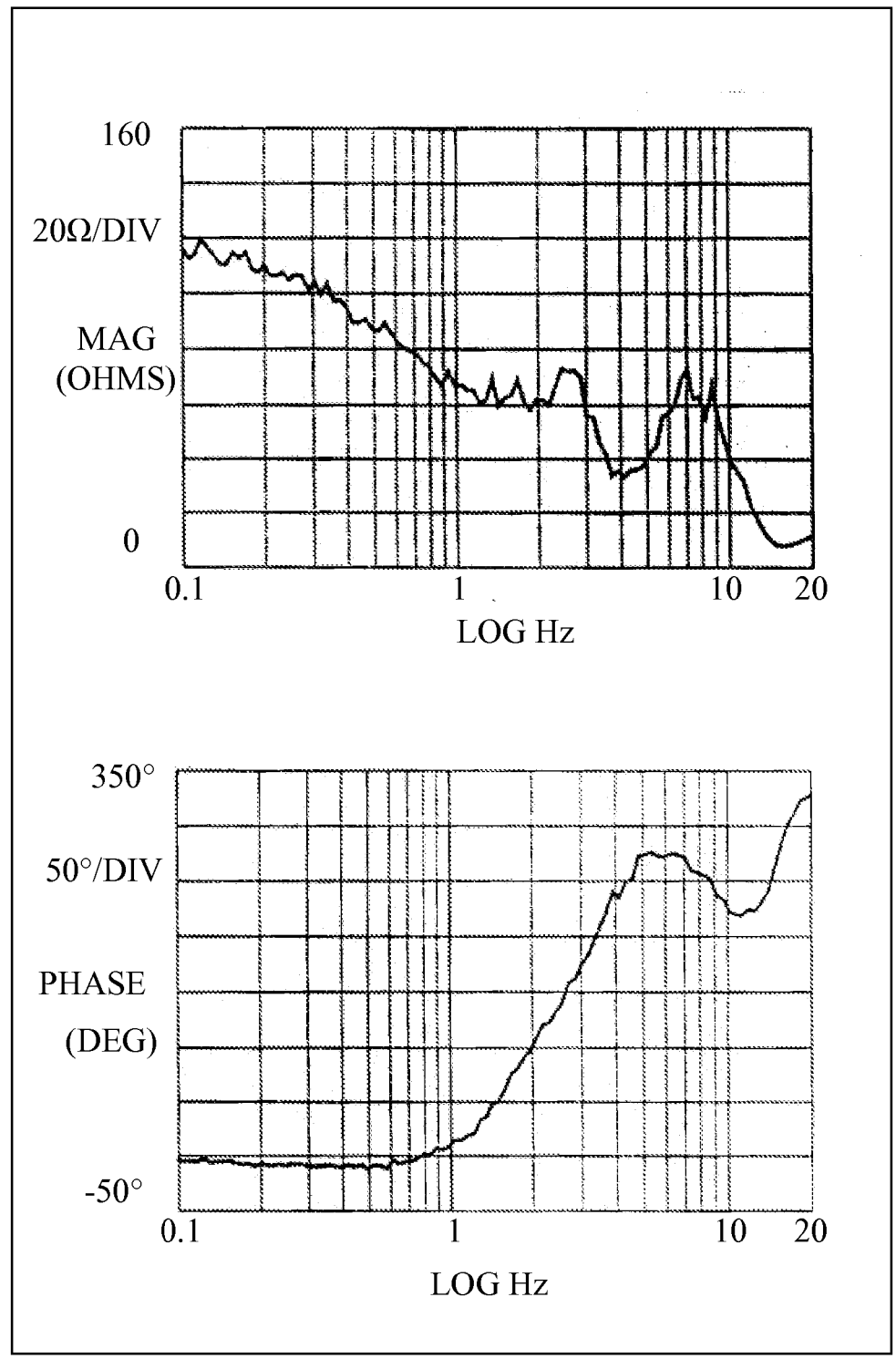
FIG. 21 is a graphical illustration of the suppressed-carrier impedance of Boston-Fincor ACE-KL 2 HP variable speed drive with Hertz-per-Volt automatic-speed control modification in Constant-Torque mode.

Where:
$R_{INLN}$=Line-to-neutral input impedance
$V_{RMSLN}$=Line-to-neutral rms voltage
$P_{IN}$=Total power input FIG. 21 presents a graphical illustration of the suppressed-carrier input impedance of the variable-speed drive motor system 100 of FIG. 20 operating in constant-torque mode. At 0.1 Hz, the input impedance is approximately 120 Ohms. The phase angle is approximately zero degrees, confirming the positive-damping quality. The test conditions were such that EQ.16A would predict a resistance of 133 Ohms.

Figure 8:
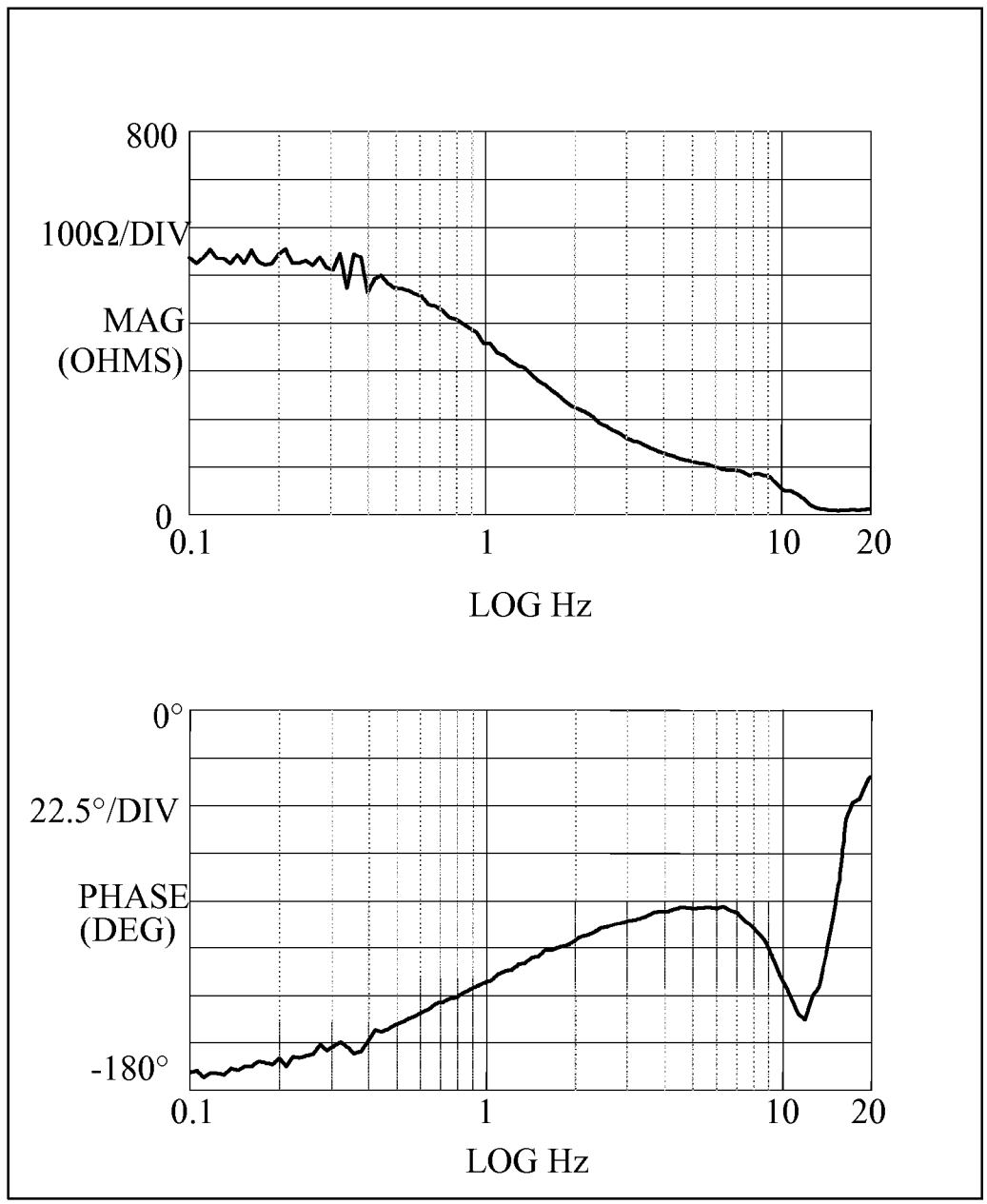
FIG. 8 is a graphical illustration of the suppressed-carrier impedance of an unmodified Boston-Fincor ACE-KL 2 HP variable speed drive with induction motor load in Constant-Torque mode.
Figure 9:
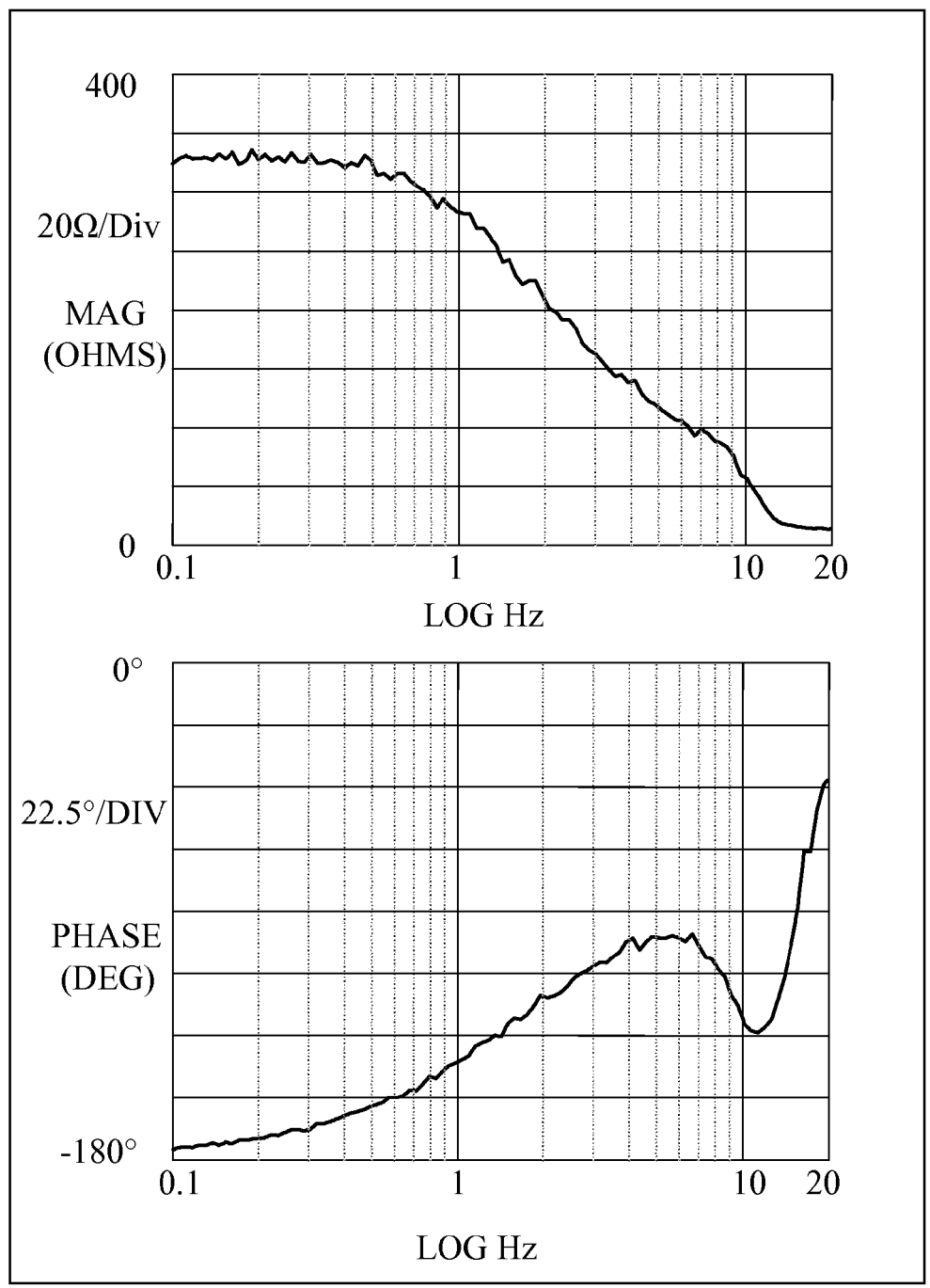
FIG. 9 is a graphical illustration of the suppressed-carrier impedance of an unmodified Boston-Fincor ACE-KL 2 HP variable speed drive with induction motor load in Fan-Pump mode.
Figure 22:
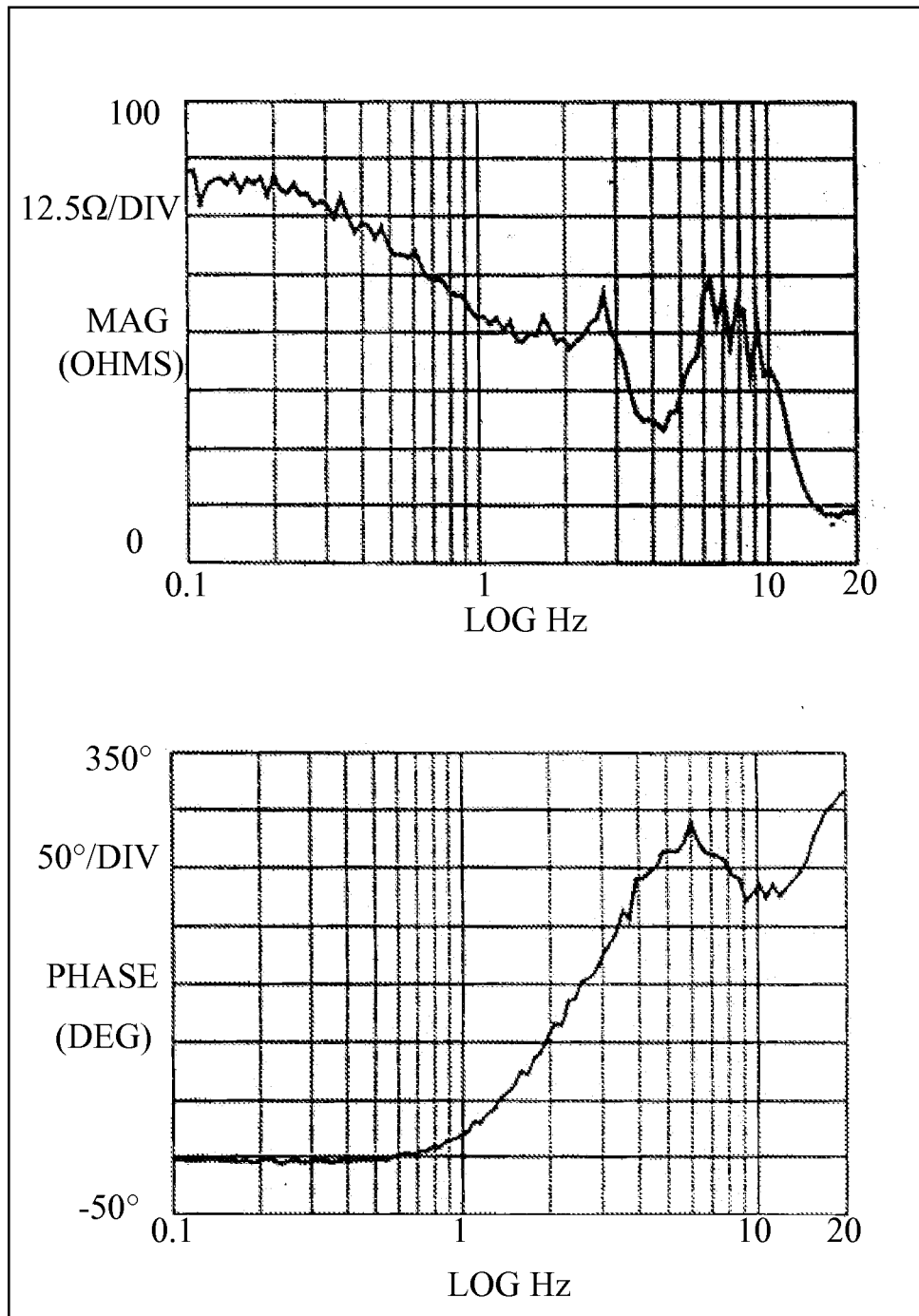
FIG. 22 is a graphical illustration of the suppressed-carrier impedance of Boston-Fincor ACE-KL 2 HP variable speed drive with Hertz-per-Volt automatic-speed control modification in Fan-Pump mode.

FIG. 22 presents a graphical illustration of the suppressed-carrier impedance of the same motor system, operating in variable-torque (fan-pump mode). At 0.1 Hz, the input impedance is approximately 83 Ohms. The phase angle is also approximately zero degrees. The test conditions were such that EQ.16B would predict a resistance of 95 Ohms. The measured low-frequency positive resistance values are somewhat lower than predicted by EQ.16A and EQ.16B. It appears likely that the lower values result from the existence of a non-ideal constant-torque mode as discussed relative to FIG. 8 and FIG. 9. The impedance measurements illustrate that the VSD input impedance is approximately resistive below 1 Hz, but becomes reactive above 1 Hz and again becomes negatively resistive above approximately 2 Hz. It is anticipated that the positive-resistance characteristic could be improved and extended to higher frequencies by optimizing the VSD controller design.

Figure 23:
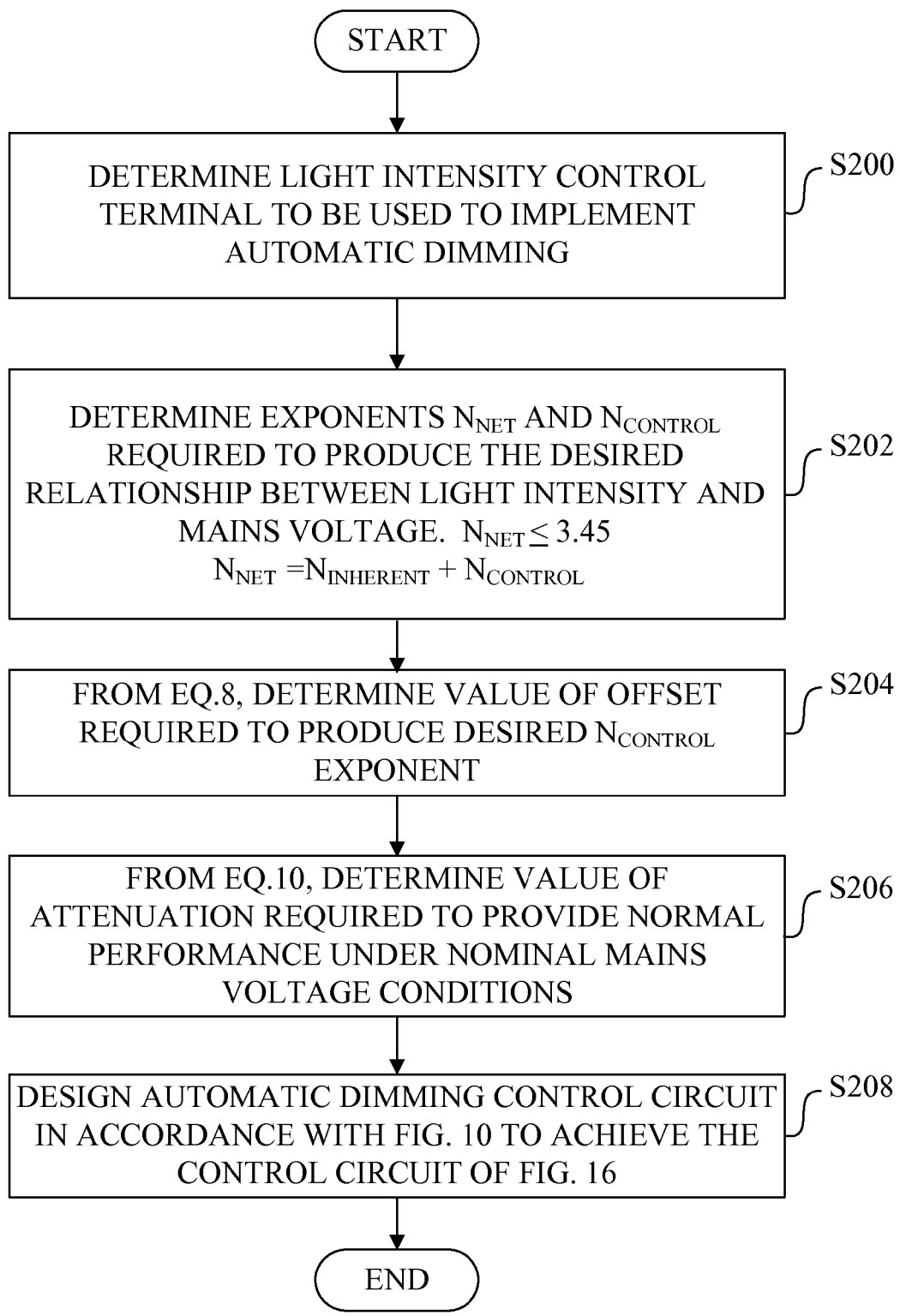
FIG. 23 is a flowchart of a method for design of an automatic dimming control for fluorescent ballast and LED driver controller in accordance with the control circuit of FIG. 10 to achieve the control circuit of FIG. 16.

FIG. 23 is a flowchart of a method for design of an automatic dimming control for fluorescent ballast and LED driver controller in accordance with control circuit 10 described above with respect to FIG. 10 to achieve the control circuit 10c of FIG. 16.

At step S200, the light intensity control terminal to be used to implement automatic dimming is determined. Most dimming fluorescent ballasts and LED driver controllers have analog dimming input pins.

At step S202, exponents $N_{NET}$ and $N_{CONTROL}$ required to produce the desired relationship between light intensity and mains voltage is determined, wherein: $N_{NET}<3.45$ and $N_{NET}=N_{INHERENT}+N_{CONTROL}$. For maximum damping of power grid oscillations, the exponent is chosen to cause the LED lighting to have flicker susceptibility equal to that of incandescent lamps. The flicker susceptibility of the incandescent lamp is assumed to represent the maximum acceptable degree of flicker susceptibility. The luminous intensity of the incandescent lamp is proportional to the 3.45 power of line voltage.

At step S204, the value of offset required to produce desired $N_{CONTROL}$ exponent is determined in accordance with EQ.8.

At step S206, determine the value of attenuation required to provide normal performance under nominal mains voltage conditions is determined in accordance with EQ.10.

At step S208, the automatic dimming control of control circuit 10c is designed in accordance with the circuit configuration of control circuit 10 of FIG. 10 to achieve the control circuit 10c of FIG. 16.

Figure 24:
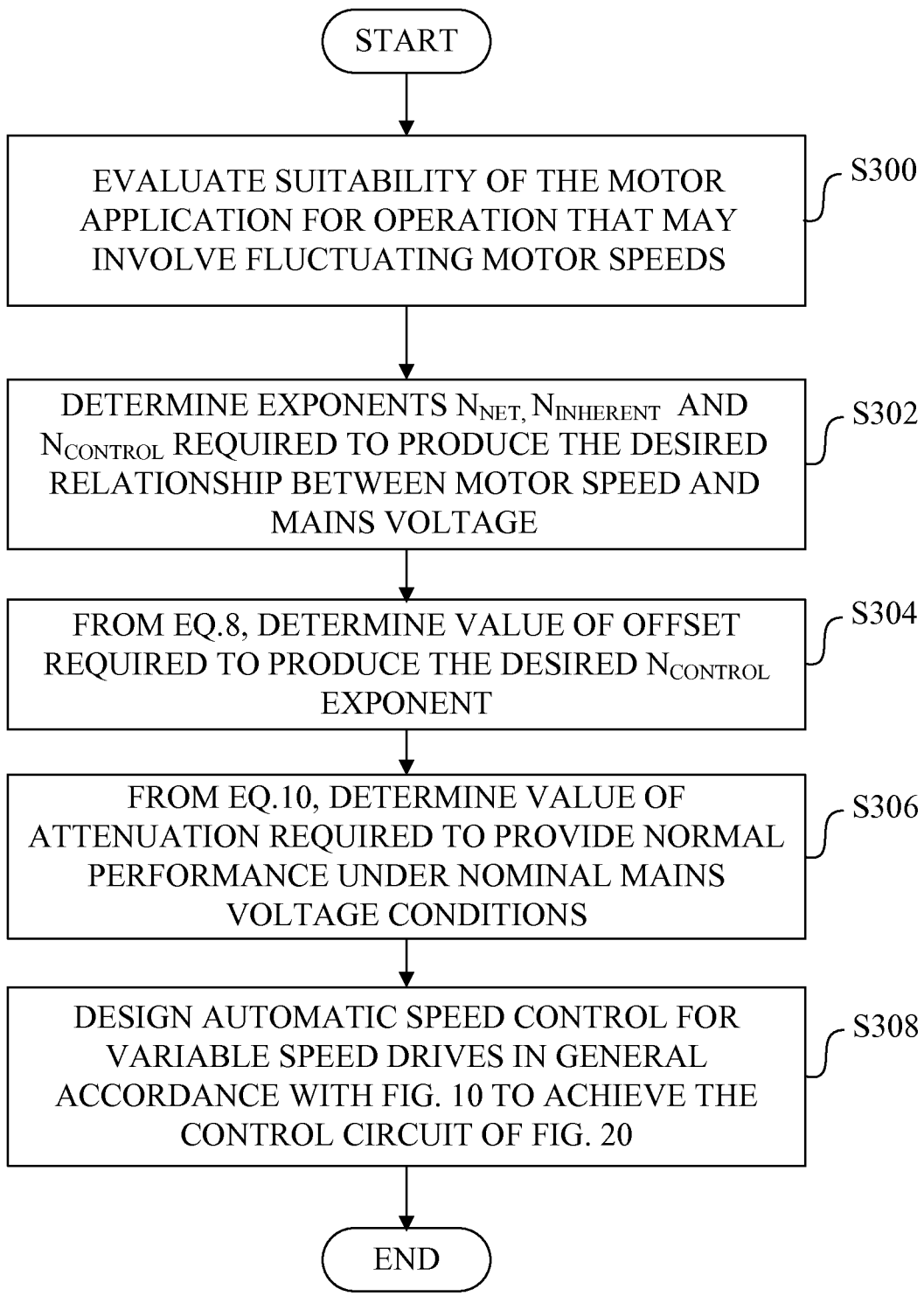
FIG. 24 is a flowchart of a method for design of an automatic speed control for variable-speed drives in accordance with the control circuit of FIG. 10 to achieve the control circuit of FIG. 20.

FIG. 24 is a flowchart of a method for design of an automatic speed control for variable-speed drives in accordance with control circuit 10 described above with respect to FIG. 10 to achieve the control circuit 10e of FIG. 20.

At step S300, the suitability of the motor application for operation that may involve fluctuating motor speeds is evaluated. For example, ventilation fans, air conditioner, heat-pump and refrigeration compressors, hydronic circulation pumps, HVAC air handler fans, municipal water pumps, washing machines, dryers, etc. applications appear to be prime candidates. For some applications, audible noise may be problematic if $N_{NET}$ is excessively high. Long conveyor belts could develop undesirable wave action in the belt.

For motor systems that can tolerate low frequency speed fluctuations but may not tolerate higher frequency fluctuations, a capacitor arranged in the same manner as capacitor C2 of FIG. 14 can be included to add low-pass filtering of $V_{CONTROL}$. The low-pass filter may be configured to limit the effect of mains voltage fluctuations above the most troublesome frequency band of power grid oscillation.

For example, a 1 Hz low-pass bandwidth would allow the drive system to provide damping for inter-area oscillation while avoiding higher frequency speed fluctuations. Similarly, a low-pass bandwidth of 4 Hz would provide damping for inter-area, local-mode and inter-unit oscillation while minimizing speed fluctuations above 4 Hz.

At step S302, the exponents $N_{NET}$, $N_{INHERENT}$ and $N_{CONTROL}$ required to produce the desired relationship between motor speed and the mains voltage are determined.

At step S304, the value of voltage offset required to produce the desired $N_{CONTROL}$ exponent is determined from EQ.8.

At step S306, the value of attenuation required to provide normal performance under nominal mains voltage conditions is determined from EQ.10.

At step S308, the automatic speed control for variable drives of control circuit 10e is designed in general accordance with the circuit configuration of control circuit 10 of FIG. 10 to achieve control circuit 10e of FIG. 20.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling an electrical load exhibiting destabilizing negative-resistance negative-damping characteristics to provide positive damping of power grid oscillations and for controlling the electrical load to operate at a reduced power level when the power grid voltage is reduced, the electrical load being coupled to an AC mains voltage of a mains supplied by the power grid, and the electrical load having a voltage control input $V_{PC}$ to control the amount of power that is delivered to the electrical load, the method comprising:

(a) determining a maximum proportionality factor $N_{NET}$ to which a load power of the electrical load can be permitted to vary in proportion to voltage fluctuations of the AC mains voltage;

(b) determining a factor $N_{INHERENT}$ to which the load power of the electrical load varies as a function of the control voltage input $V_{PC}$;

(c) determining a constant $N_{CONTROL}$, wherein the constant $N_{CONTROL}$ is the ratio of the proportionality factor $N_{NET}$ and the factor $N_{INHERENT}$, such that $N_{CONTROL} = N_{NET}/N_{INHERENT}$;

(d) measuring a modulation envelope of the AC mains voltage, the modulation envelope including a component equal to the peak value of the nominal mains voltage $V_{PDNOM}$, and voltage fluctuations relative to $V_{PDNOM}$;

(e) accentuating the voltage fluctuations of the modulation envelope by the constant $N_{CONTROL}$ relative to $V_{PDNOM}$ to form an accentuated signal;

(f) scaling the accentuated signal to form a control voltage signal $V_{CONTROL}$ that is equal to the nominal value of the control voltage input $V_{PC}$ of the electrical load at the nominal mains voltage; and (g) substituting the control voltage signal $V_{CONTROL}$ for the control voltage input $V_{PC}$ of the electrical load.

2. The method of claim 1, wherein the act of measuring the modulation envelope of the AC mains voltage is at each peak of the AC mains voltage at successive instants occurring at multiples of the mains frequency.

3. The method of claim 1, wherein for a particular electrical load not inherently having a control voltage input $V_{PC}$, the method further comprising an interface circuit to translate the characteristics of $V_{CONTROL}$ to be compatible with a control parameter existing within the particular electrical load that is not inherently controllable by a voltage signal, but that does form a parameter that, if varied, will vary the amount of power consumed by the particular electrical load.

4. The method of claim 1, wherein the electrical load is a Light Emitting Diode (LED) lighting system employing an electronic LED driver, and wherein the luminous intensity of the light is modulated to cause the power delivered to the electrical load to vary in proportion to the AC mains voltage.

5. The method of claim 1, wherein the electrical load is a Light Emitting Diode (LED) lighting system employing an electronic LED driver, and wherein the luminous intensity of the light is modulated to cause the power delivered to the electrical load to vary in proportion to the AC mains voltage, and wherein the proportionality factor $N_{NET}$ is selected to provide maximum positive-damping of power grid oscillations while constraining flicker susceptibility of the LED lighting system to be equal to, or less than that of a typical incandescent lamp.

6. The method of claim 1, wherein the electrical load is a fluorescent lighting system employing an electronic ballast, and wherein the luminous intensity of the light is modulated to cause the power delivered to the electrical load to vary in proportion to the AC mains voltage.

7. The method of claim 1, wherein the electrical load is a fluorescent lighting system employing an electronic ballast, and wherein the luminous intensity of the light is modulated to cause the power delivered to the electrical load to vary in proportion to the AC mains voltage, and wherein the proportionality factor $N_{NET}$ is selected to provide maximum positive-damping of power grid oscillations while constraining flicker susceptibility of the fluorescent lighting system to be equal to, or less than that of a typical incandescent lamp.

8. The method of claim 1, wherein the electrical load is a motor driven system employing a variable-speed drive, and wherein the electrical power delivered to the motor is modulated to cause the electrical power delivered to the motor to vary in proportion to the AC mains voltage.

9. The method of claim 1, wherein the electrical load is a motor driven system employing a variable-speed drive, and wherein the electrical power delivered to the motor is modulated to cause the electrical power delivered to the motor to vary in proportion to the AC mains voltage, and wherein the proportionality factor $N_{NET}$ is selected to provide maximum positive-damping of power grid oscillation while not exceeding the performance parameter limits of the motor system.

10. A control circuit for controlling an electrical load exhibiting destabilizing negative-resistance negative-damping characteristics to provide positive damping of power grid oscillations and for controlling the electrical load to operate at a reduced power level when the power grid voltage is reduced, the electrical load being coupled to an AC mains voltage of a mains supplied by the power grid, and the electrical load having a voltage control input $V_{PC}$ to control the amount of power that is delivered to the electrical load, the control circuit comprising:

(a) a peak detector circuit configured to measure a modulation envelope of the AC mains voltage, the modulation envelope including a component equal to the peak value of the nominal mains voltage $V_{PDNOM}$, and voltage fluctuations relative to $V_{PDNOM}$;

(b) an offset voltage insertion circuit coupled to the peak detector circuit, the offset voltage insertion circuit configured to accentuate the voltage fluctuations of the modulation envelope by a constant $N_{CONTROL}$ relative to $V_{PDNOM}$ to form an accentuated signal; and (c) an attenuation circuit coupled to the offset voltage insertion circuit, the attenuation circuit configured to scale the accentuated signal to form a control voltage signal $V_{CONTROL}$ that is equal to the nominal value of the control voltage input $V_{PC}$ of the electrical load at the nominal mains voltage, the attenuation circuit being configured to substitute the control voltage signal $V_{CONTROL}$ for the control voltage input $V_{PC}$ of the electrical load.

11. The control circuit of claim 10, wherein the peak detector circuit is configured to measure the modulation envelope of the AC mains voltage at each peak of the AC mains voltage at successive instants occurring at multiples of the mains frequency.

12. The control circuit of claim 10, wherein the peak detector circuit includes:

at least one diode configured to detect peaks of the AC mains voltage;

at least one resistor coupled to the at least one diode; and a capacitor coupled to the at least one diode, wherein a current conducted by the at least one diode at the AC mains voltage peaks charges the capacitor to store the detected peak voltage, and the at least one resistor being configured to provide a discharge path to slowly discharge the capacitor sufficiently to ensure that a next occurring mains voltage peak will be measured without error occurring as a result of residual voltage persisting from the previously sampled mains voltage peak while sustaining the previously sampled mains voltage peak without excessive error until the subsequent mains voltage peak is detected.

13. The control circuit of claim 10, wherein the offset voltage insertion circuit includes a zener diode located in a signal path between the peak detector circuit and the attenuation circuit and configured to insert an offset voltage $V_{OFFSET}$, wherein a current flow in the zener diode will be in the reverse direction that will cause the voltage drop across the zener diode to be approximately equal to a specified zener voltage of the zener diode, and the specified zener voltage being approximately equal to the intended offset voltage $V_{OFFSET}$.

14. The control circuit of claim 10, wherein the offset voltage insertion circuit employs a negative voltage to cause a negative voltage to be inserted in the signal path between the peak detector circuit and an attenuator output of the attenuation circuit.

15. The control circuit of claim 10, wherein the AC mains voltage is processed by a power rectifier to provide unregulated DC power to a power converter, and the peak detector circuit has a single detector diode to detect peaks at the output of the power rectifier.

16. The control circuit of claim 10, wherein a signal path from the peak detector circuit to a $V_{CONTROL}$ output of the attenuation circuit further includes a low-pass filter configured to limit the effect of mains voltage fluctuations above the inter-area frequency band of power grid oscillation.

17. The control circuit of claim 10, wherein a signal path from the peak detector circuit to a $V_{CONTROL}$ output of the attenuation circuit further includes a low-pass filter configured to limit the effect of mains voltage fluctuations above the inter-area and local-mode frequency band of power grid oscillation.

18. The control circuit of claim 10, wherein a signal path from the peak detector circuit to a $V_{CONTROL}$ output of the attenuation circuit further includes a low-pass filter configured to limit the effect of mains voltage fluctuations above the inter-area, local-mode and inter-unit frequency band of power grid oscillation.

19. The control circuit of claim 10, wherein a signal path from the peak detector circuit to a $V_{CONTROL}$ output of the attenuation circuit further includes a low-pass filter configured to limit the effect of mains voltage fluctuations above the frequency band of potential micro-grid oscillatory instability.

20. The control circuit of claim 10, wherein a signal path from the peak detector circuit to a $V_{CONTROL}$ output of the attenuation circuit further includes a low-pass filter configured to limit the effect of mains voltage fluctuations above the frequency band of potential back-up power system oscillatory instability.

21. The control circuit of claim 10, wherein for a particular electrical load not inherently having a control voltage input $V_{PC}$, the control circuit further comprising an interface circuit configured to translate the characteristics of $V_{CONTROL}$ to be compatible with a control parameter existing within the particular electrical load that is not inherently controllable by a voltage signal, but that does form a parameter that, if varied, will vary the amount of power consumed by the particular electrical load.

* * * * *